(12) United States Patent
Aldaz et al.

(10) Patent No.: US 8,238,278 B2
(45) Date of Patent: *Aug. 7, 2012

(54) HARDWARE-BASED BEACON PROCESSING

(75) Inventors: Luis Aldaz, San Jose, CA (US); Luis Aldaz, Sr., legal representative, Tarragona (ES); Kaushik Barman, Hyderabad (IN); Allan A. Johnson, Santa Clara, CA (US); Raghavendra Malladi, Hyderabad (IN)

(73) Assignee: Hellosoft, Inc., Sunnyvale, CA (US)

( * ) Notice: Subject to any disclaimer, the term of this patent is extended or adjusted under 35 U.S.C. 154(b) by 1384 days.

This patent is subject to a terminal disclaimer.

(21) Appl. No.: 11/651,358

(22) Filed: Jan. 8, 2007

(65) Prior Publication Data

US 2008/0165769 A1 Jul. 10, 2008

(51) Int. Cl.
*G08C 17/00* (2006.01)
(52) U.S. Cl. ........................................ 370/311; 455/574
(58) Field of Classification Search .................. 370/311, 370/347, 338, 412, 392; 709/224
See application file for complete search history.

(56) References Cited

U.S. PATENT DOCUMENTS

| 5,699,357 | A   | * | 12/1997 | Carvey          | 370/347 |
|-----------|-----|---|---------|-----------------|---------|
| 7,072,697 | B2  |   | 7/2006  | Lappetelainen et al. | |
| 7,209,467 | B2  | * | 4/2007  | Liu et al.      | 370/338 |
| 7,233,991 | B2  | * | 6/2007  | Adhikari        | 709/224 |
| 7,454,634 | B1  | * | 11/2008 | Donovan et al.  | 713/322 |
| 7,684,835 | B1  | * | 3/2010  | Vu et al.       | 455/574 |
| 7,881,755 | B1  | * | 2/2011  | Mishra et al.   | 455/574 |
| 2004/0224728 | A1 | * | 11/2004 | Dacosta et al. | 455/574 |
| 2005/0042999 | A1 | * | 2/2005  | Rappaport      | 455/307 |
| 2005/0132238 | A1 |   | 6/2005  | Nanja          | |
| 2005/0220106 | A1 | * | 10/2005 | Raverdy et al. | 370/392 |
| 2005/0270993 | A1 | * | 12/2005 | Rajamani et al.| 370/311 |
| 2006/0030353 | A1 |   | 2/2006  | Jun            | |
| 2006/0083168 | A1 | * | 4/2006  | Prakash        | 370/230 |
| 2006/0184987 | A1 |   | 8/2006  | Allen et al.   | |
| 2006/0270382 | A1 |   | 11/2006 | Lappetelainen et al. | |
| 2007/0127403 | A1 | * | 6/2007  | Lu et al.      | 370/311 |
| 2007/0171910 | A1 | * | 7/2007  | Kumar          | 370/392 |
| 2007/0211745 | A1 |   | 9/2007  | Deshpande et al. | |
| 2007/0223431 | A1 | * | 9/2007  | Jaakkola       | 370/338 |
| 2007/0230493 | A1 | * | 10/2007 | Dravida et al. | 370/412 |
| 2007/0248034 | A1 | * | 10/2007 | Hsu et al.     | 370/318 |
| 2007/0274488 | A1 |   | 11/2007 | Callaghan      | |
| 2008/0049789 | A1 |   | 2/2008  | Vedantham et al. | |
| 2008/0165780 | A1 |   | 7/2008  | Aldaz et al.   | |

OTHER PUBLICATIONS

Newton, Harry "Newton's Telecom Dictionary", *CMP Books, 18th Edition*, (2002),p. 141.

* cited by examiner

*Primary Examiner* — Steven H Nguyen
(74) *Attorney, Agent, or Firm* — Michael S. Garrabrants; ArtesynIP, Inc.

(57) ABSTRACT

Hardware-based beacon processing. A hardware-centric medium access control (MAC) device includes a packet receiver and a beacon processor. The packet receiver receives a plurality of packets comprising at least one beacon packet. The beacon processor receives packets of the plurality of packets and filters out unwanted packets of the plurality of packets without requiring the use of other components of the hardware-centric MAC device and without requiring the use of a microprocessor.

11 Claims, 14 Drawing Sheets

HARDWARE-BASED BEACON PROCESSING

Embodiments of the present invention pertain to the field of wireless communication.

BACKGROUND

Data communication devices, such as wireless communication devices, typically employ Medium Access Control (MAC) functionality for controlling access to a physical transmission medium of the device. Typically, MAC functionality is implemented in software running on a processor. Moreover, data communication devices include a number of other software applications running on a processor, applications for rendering and transmitting voice communication.

Current implementations of data communication devices typically employ dual-core (e.g., two processors) architecture. Without two processors, a software MAC may introduce problems detrimentally affecting the performance of the data communication device. For instance, modern functions and media processing using the software MAC have tight real-time processing requirements. While other applications do not have these tight real-time processing requirements, the application drivers include disable interrupts for accessing a processor. These disable interrupts interfere with real-time functions. In other words, the processing of the software MAC functions having tight real-time constraints and the other applications not having tight real-time constraints are mutually exclusive to a single processor, as a processor can only be accessed once at any time. This fundamental incompatibility is solved by multiple processors.

However, the design and modification of communication devices including two processors is complex and expensive. Moreover, where one of the processors is a digital signal processor (DSP), as is typically the case, the design and modification becomes even more complex and expensive. DSPs require specialized toolsets and firmware, and software engineers who design DSPs require specialized training. Also, DSPs are considerably more expensive than standard processors. Furthermore, the operation of two processors consumes more power and is more expensive than the operation of a single processor.

SUMMARY

Various embodiments of the present invention, hardware-based beacon processing, are described herein. A hardware-centric medium access control (MAC) device includes a packet receiver and a beacon processor. The packet receiver receives a plurality of packets comprising at least one beacon packet. The beacon processor receives packets of the plurality of packets and filters out unwanted packets of the plurality of packets without requiring the use of other components of the hardware-centric MAC device and without requiring the use of a microprocessor.

BRIEF DESCRIPTION OF THE DRAWINGS

Embodiments of present invention are illustrated by way of example, and not by way of limitation, in the figures of the accompanying drawings and in which like reference numerals refer to similar elements and in which.

DESCRIPTION OF EXAMPLE EMBODIMENTS

Figure 1:
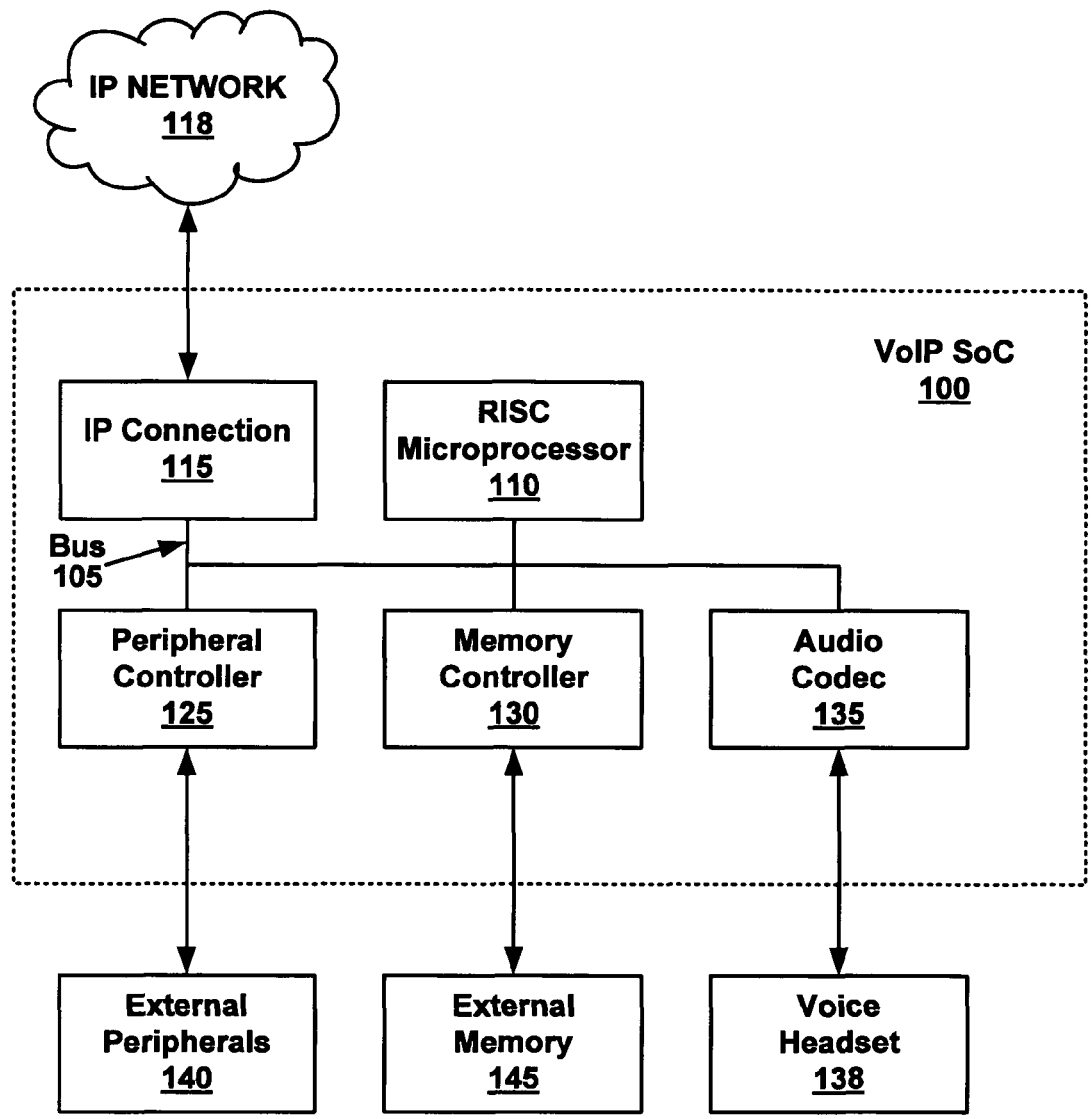
FIG. 1 illustrates a block diagram of a voice over Internet Protocol (VoIP) communication device operating on a Reduced Instruction Set Computer (RISC) microprocessor, in accordance with one embodiment of the present invention.

Reference will now be made in detail to particular embodiments of the present invention, examples of which are illustrated in the accompanying drawings. While the invention will be described in conjunction with the particular embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of particular embodiments of the present invention. However, it will be recognized by one of ordinary skill in the art that embodiments of the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the particular embodiments of the present invention, discussions utilizing terms such as "receiving" or "transmitting" or "performing" or "providing" or "requiring" or "fragmenting" or "defragmenting" or "activating" or "deactivating" or "recognizing" or "controlling" or "outputting" or "rendering" or "executing" or "forwarding" or "sensing" or "decoding" or "determining" or "processing" or the like, refer to the action and processes of a single-processor voice communication device, e.g., voice over Internet Protocol (VoIP) system in a chip (SoC) 100 of FIG. 1, voice over wireless local area network (VoWLAN) SoC 300 of FIG. 3, VoWLAN communication device 400 of FIG. 4, cellular/VoWLAN (CelluLAN) SoC 800 of FIG. 8, and CelluLAN communication device 900 of FIG. 9, or similar electronic computing device, that manipulates and transforms data represented as physical (electronic) quantities within the computer system's registers and memories into other data similarly represented as physical quantities within the computer system memories or registers or other such information storage, transmission or display devices.

DSP-Less VoIP

FIG. 1 illustrates a block diagram of a voice over Internet Protocol (VoIP) system in a chip (SoC) 100 using a single processor. Various described embodiments provide VoIP that is performed as software executed on a general purpose microprocessor, such as a Reduced Instruction Set Computer (RISC) microprocessor. The described embodiments detail numerous optimizations that allow for providing VoIP using a single microprocessor. In particular, embodiments of the present invention provide for VoIP functionality within a single microprocessor without the need for a dedicated digital signal processor (DSP).

VoIP SoC 100 includes a single microprocessor 110, in accordance with one embodiment of the present invention. VoIP SoC 100 includes microprocessor 110, Internet Protocol (IP) connection 115, system peripheral controller 125, system memory controller 130 and audio codec 135, all communicatively coupled over bus 105. It should be appreciated that VoIP SoC 100 may include additional components, as understood by those of skill in the art. These additional components are not described herein so as to not obscure the embodiments described herein.

It should be appreciated that bus 105 illustrates that each of the components of VoIP SoC 100 are communicatively coupled. However, it should be appreciated that bus 105 can be implemented as a central bus, as shown, individual interconnections between the individual components, or any combination of buses and individual interconnections. In particular, it should be appreciated that bus 105 is not intended to be limited by the shown embodiment.

In one embodiment, microprocessor 110 is operable to perform all necessary operations associated with VoIP communication, including digital signal processing and control functions. In particular, microprocessor 110 is not a dedicated DSP. In one embodiment, microprocessor 110 is a multi-purpose processor, such as a central processing unit (CPU). In one embodiment, microprocessor 110 is a RISC microprocessor. Details specifying the operation of a RISC implementation of microprocessor 110 are described below in accordance with FIG. 2.

IP connection 115 is operable to communicate with an IP network 118, so as to provide VoIP communication over IP network 118. It should be appreciated that IP connection 115 is operable to communicate with IP network 118 over a wired or wireless connection. System peripheral controller 125 is communicatively coupled to external system peripherals 140 that include additional components that provide added functionality to VoIP SoC 100. System memory controller 130 is communicatively coupled to external memory 145 for use in operating VoIP SoC 100. External memory 145 may include volatile memory, such as RAM, SRAM, and SDRAM (Mobile SDRAM or DDR, Cellular RAM etc), and non-volatile memory, such as EEPROM, and NOR or NAND flash. It should be appreciated that external memory 145 may include multiple types of memory, all of which are represented as external memory 145.

Audio codec 135 is operable to encode and decode audio data for use in communicating voice data using VoIP. It should be appreciated that audio codec 135 may be implemented as hardware, software, firmware, or any combination thereof. In one embodiment, audio codec 135 provides for coupling VoIP SoC 100 to an external device for rendering the voice communication and for receiving voice communication. In one embodiment, audio codec 135 is coupled to voice headset 138. However, it should be appreciated audio codec 135 may be coupled to many different types of devices and interfaces, including but not limited to Foreign Exchange Subscriber (FXS) interfaces, Foreign Exchange Office (FXO) interfaces, microphones, and speakers.

Figure 2:
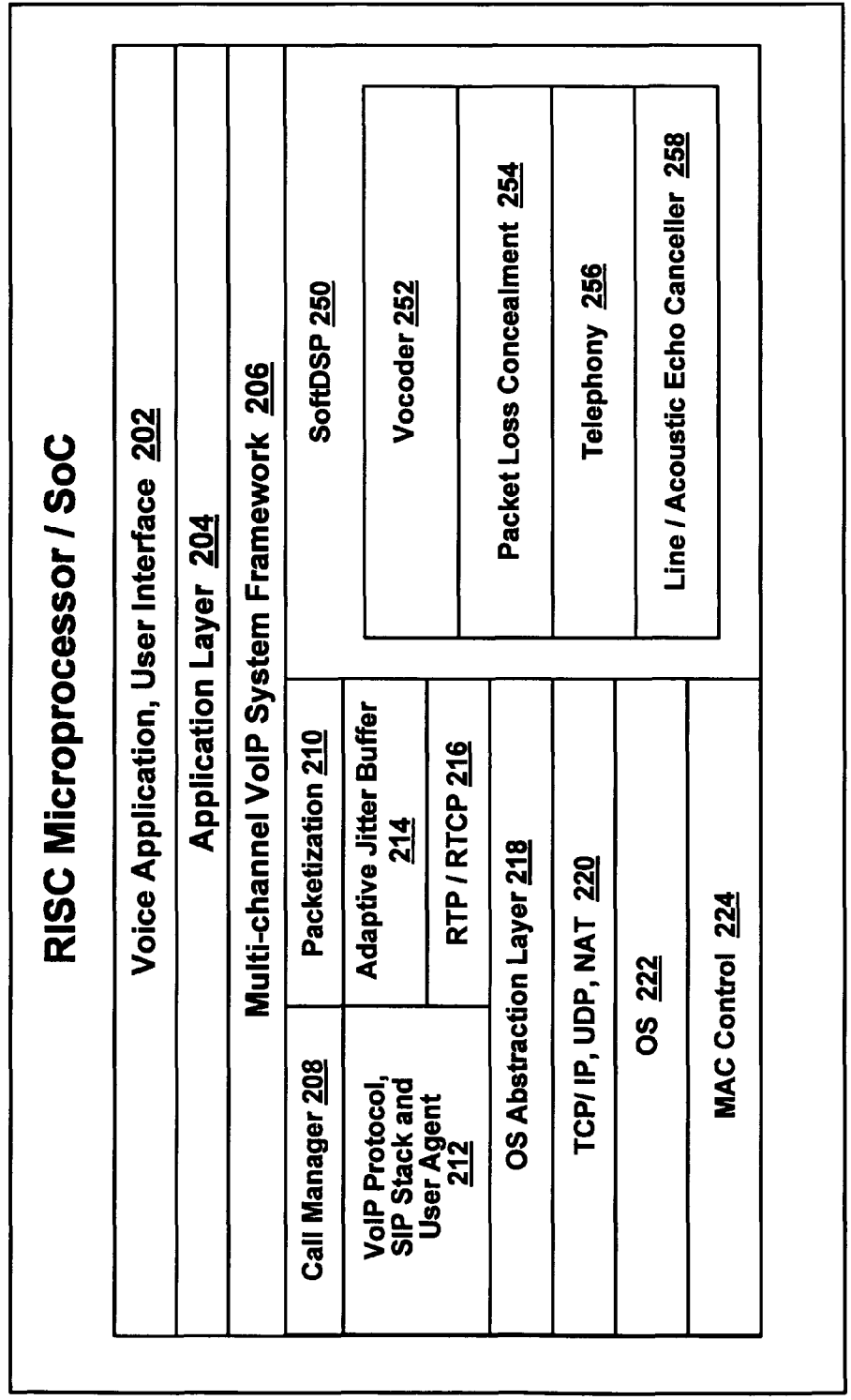
FIG. 2 illustrates a software stack of the RISC microprocessor, in accordance with one embodiment of the present invention.

FIG. 2 illustrates a software stack 200 of an embedded RISC microprocessor, in accordance with one embodiment of the present invention. Software stack 200 illustrates operations and application executed by a RISC microprocessor, e.g., microprocessor 110 of FIG. 1. In one embodiment, software stack 200 includes the following applications: voice application and user interface 202, application layer 204, multi-channel VoIP system framework 206, call manager 208, packetization 210, VoIP Protocol, SIP stack and user agent 212, adaptive jitter buffer 214, RTP/RTCP 216, operating system (OS) abstraction layer 218, TCP/IP, UDP and NAT 220, OS 222, and MAC control layer 224. It should be appreciated that applications 202-224 are applications typically included in standard VoIP implementations, and are well-understood by those of skill in the art. Specific operation details of these applications are not included herein, so as to not obscure the described embodiments. In one embodiment, the RISC processor also runs a MAC control layer and/or firmware under the OS.

Software stack 200 also includes voice processing applications and operations, collectively identified as SoftDSP 250. The voice processing applications of SoftDSP 250 necessitate significant computational requirements which typically have been addressed by having a separate DSP processor which has specialized hardware support to efficiently map the arithmetic computations in these operations on a programmable architecture. The DSP is always used in conjunction with a general purpose RISC microprocessor which typically handles all the control functions, e.g., application 202-224. In one embodiment, SoftDSP 250 applications include vocoder 252, packet loss concealment 254, telephony 256, and line/acoustic echo canceller 258. The operational details of applications 252-258 are well-understood by those of skill in the art and are not included herein, so as to not obscure the described embodiments.

In order to implement voice processing applications of SoftDSP 250 on a RISC microprocessor, it is necessary to minimize data loading from external memory (e.g., SDRAM) to internal registers of the RISC microprocessor. In one embodiment, data loading is minimized by improving data locality for block processing of loaded data. RISC architectures are load-store, which essentially requires that every data element needs to be loaded to in internal registers before the element can be operated on. Each load operation requires one or more cycle cycles depending upon the availability of the data in cache. For example, considering that all successive MAC operations, e.g., Multiply Accumulate Multiply Add operations, in a computational loop typically require at least one unique operand, an operation implementing ten million MACs may require at least seventeen to twenty million load operations to be performed along with the ten million MACs, thus substantially increasing the cycles required for completing these 10 million MAC operations.

One of the properties of the operations is that they are iterative and most data elements are used multiple times by the MAC operations during the execution of these iterative loops, but in most cases the operations which make use of common data elements are computationally far separated. Typically, most computational loops are structured such that they are oriented for computational locality where most data elements required for these computations are distributed, meaning most consecutive computations require unique data elements to be loaded hence discarding the existing data in the registers. Also, the discarded data needs to be reloaded to the registers from external memory during the next iteration of the loop when it is required hence resulting in substantial overhead.

One of the mechanisms of reducing the overhead is by loading the operands in the RISC microprocessor's internal registers in specific block sets and then realigning the inner and outer computational loops such that only specific sections of the operation are executed in which the computations require only these data elements which are available in the registers at that specific instance. This achieves much higher data loading efficiency, e.g., data locality allows for the execution of MAC and other arithmetic computations with least number of cycles wasted in loading data from external memory to internal registers. In one embodiment, the re-loading of data is minimized by reorganizing the loops for data locality rather than computational locality, e.g., instead of implementing nearest neighbor computation successively, the computation is distributed logically but requires the same data elements which are available in the RISC microprocessor's internal register. In one embodiment, the loops are re-oriented from the traditional sequential processing to a block processing structure such that each block requires only those elements, which are available in the registers.

It should be appreciated that the efficiency that can be achieved using data locality depends on the numbers of available registers. In one embodiment, the number of available registers that can be used for block processing is maximized by identifying the registers which contain relevant data but are not required during the processing of the loop and temporarily saving these registers on the stack and making them available as scratch registers. These registers are restored back to their original state from the stack after the execution of the loop has been completed.

With some RISC microprocessor architectures it is feasible to use the upper 16-bit and lower 16-bit of a 32-bit register as separate signed integer operands for arithmetic operations. In one embodiment, this feature is used to load two successive 16-bit signed data elements using a single 32-bit unsigned load operation and use them as two separate 16-bit data elements in arithmetic computations. Using this method along with block load and processing described above, the data loading efficiency is further significantly improved as exemplified below.

Another arithmetic operation is to check for overflow and underflow of accumulated results while performing left bit shifting operations for adjusting the fixed point Q format of the Accumulated results. During this left shifting of bits of accumulated results, overflow or underflow can occur, which needs to be identified and the operand should be rounded off to either MIN or MAX value. For implementing arithmetic left shift of a 32 or 16-bit signed value M by N bits with overflow detection, previous solutions were typically iterative. The iterative approach requires implementing one bit shift at a time and checking for overflow at the end of each iteration, thus requiring N iterations. The present embodiment determines guard bits for ensuring against overflow without requiring N iterations. The present embodiment determines guard bits using an arithmetic function by determining if the signed number M will overflow if it is left shifted by N bits. The present embodiment significantly reduces the clock cycles compared to the previously used iterative method. The arithmetic solution takes 2-4 clock cycles.

Various embodiments of the present invention provide a VoIP solution that does not require a DSP. This is accomplished by optimizing a general microprocessor, such as a RISC processor, for performing voice processing. By removing the requirement for a DSP in VoIP communications, the described embodiments provide a lower cost solution for VoIP communications.

DSP-Less VoWLAN

Figure 3:
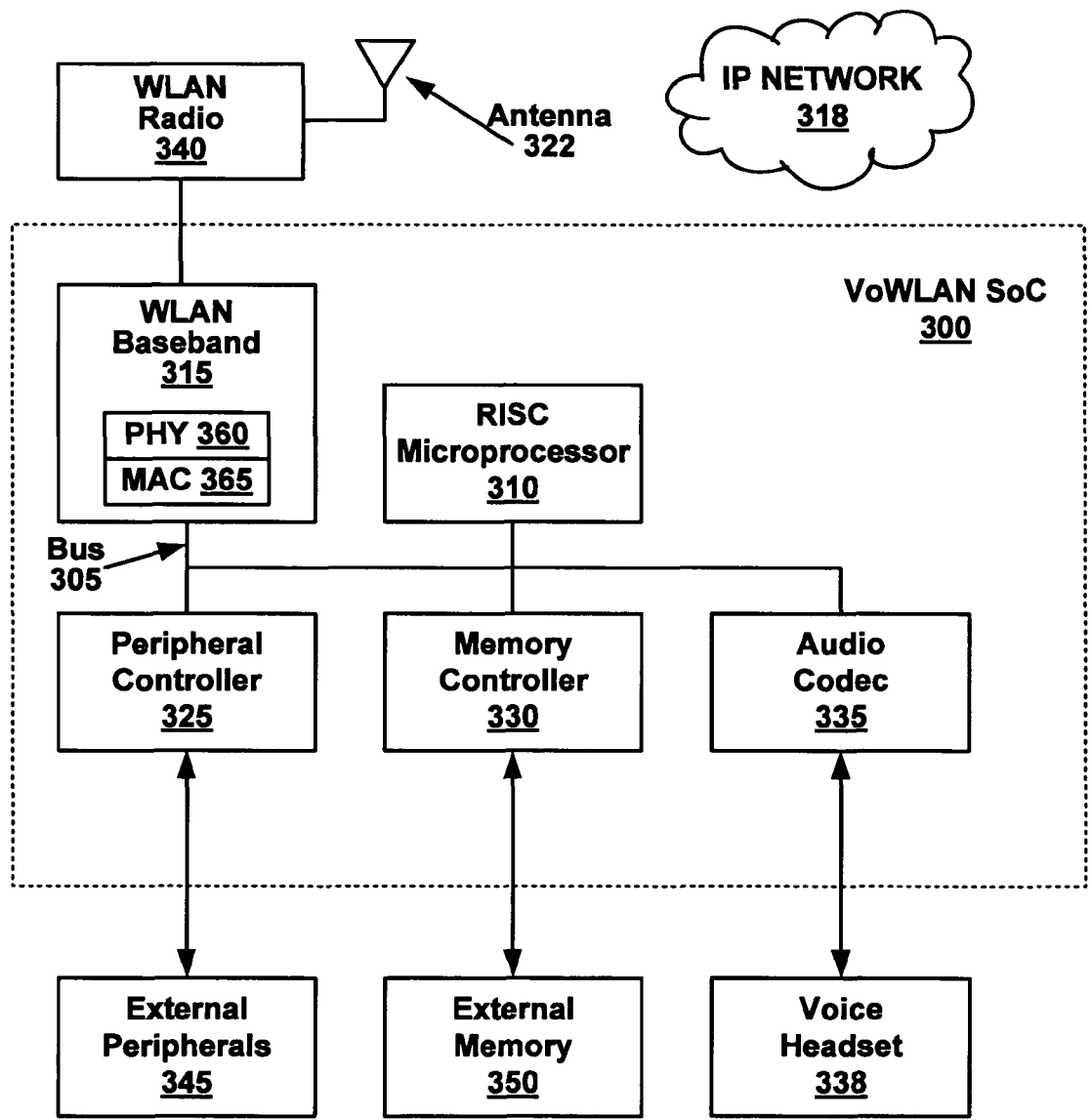
FIG. 3 illustrates a block diagram of a voice over wireless local area network (VoWLAN) communication device including a single microprocessor, in accordance with one embodiment of the present invention.

FIG. 3 illustrates a block diagram of a voice over wireless local area network (VoWLAN) SoC 300 including a single microprocessor 310, in accordance with one embodiment of the present invention. VoWLAN SoC 300 includes microprocessor 310, WLAN baseband 315, system peripheral controller 325, system memory controller 330 and audio codec 335, all communicatively coupled over bus 305. It should be appreciated that VoWLAN SoC 300 may include additional components, as understood by those of skill in the art. These additional components are not described herein so as to not obscure the embodiments described herein.

It should be appreciated that bus 305 illustrates that each of the components of VoWLAN SoC 300 are communicatively coupled. However, it should be appreciated that bus 305 can be implemented as a central bus, as shown, individual interconnections between the individual components, or any combination of buses and individual interconnections. In particular, it should be appreciated that bus 305 is not intended to be limited by the shown embodiment.

In one embodiment, microprocessor 310 is operable to perform all necessary operations associated with VoIP communication, including digital signal processing and control functions. In particular, microprocessor 310 is not a dedicated digital signal processor (DSP). In one embodiment, microprocessor 310 is a multi-purpose processor, such as a CPU. In one embodiment, microprocessor 310 is a RISC microprocessor. For example, the RISC microprocessor may be implemented as one of two general classes, one with signaling and signal processing algorithms implemented in software on the RISC micro-controller as in, e.g., a softDSP, and second where some of the signal processing blocks are implemented in hardware to reduce MIPS load on the RISC.

It should be appreciated that microprocessor 310 is operable to provide VoIP communications in accordance with the various embodiments described in accordance with FIGS. 1 and 2.

WLAN baseband 315 is operable to communicate with an IP network 318 over a wireless connection using external WLAN radio 340 comprising antenna 322, so as to provide VoIP communication over IP network 318. In one embodiment, WLAN baseband 315 includes a physical layer (PHY) device 360 and a medium access control (MAC) device 365. In one embodiment, MAC device 365 is a hardware device that is configured to perform real-time voice communication functions independent of microprocessor 310. One embodiment of the operation of MAC device 365 is described in FIG. 5.

System peripheral controller 325 is communicatively coupled to external system peripherals 345 that include additional components that provide added functionality to VoIP VoWLAN 300. System memory controller 330 is communicatively coupled to external memory 350 for use in operating VoIP VoWLAN 300. External memory 350 may include volatile memory, such as RAM, SRAM, and SDRAM, and non-volatile memory, such as EEPROM, and NOR or NAND. It should be appreciated that external memory 350 may include multiple types of memory, all of which are represented as external memory 350.

Audio codec 335 is operable to encode and decode audio data for use in communicating voice data using VoIP. It should be appreciated that audio codec 335 may be implemented as hardware, software, firmware, or any combination thereof. In one embodiment, audio codec 335 provides for coupling VoIP VoWLAN 300 to an external device for rendering the voice communication and for receiving voice communication. In one embodiment, audio codec 335 is coupled to voice headset 338. However, it should be appreciated audio codec 335 may be coupled to many different types of devices and interfaces, including but not limited to FXS interfaces, FXO interfaces, microphones, and speakers.

It should be appreciated that VoWLAN SoC 300 provides for voice communication over a WLAN without requiring the use of a dedicated DSP as well as a general-purpose microprocessor. In particular, VoWLAN SoC 300 is operable to perform voice processing on the general-purpose microprocessor 310 (e.g., a RISC microprocessor). Microprocessor 310 is configured to provide all voice processing and control functionality for operation of VoWLAN SoC 300.

Figure 4:
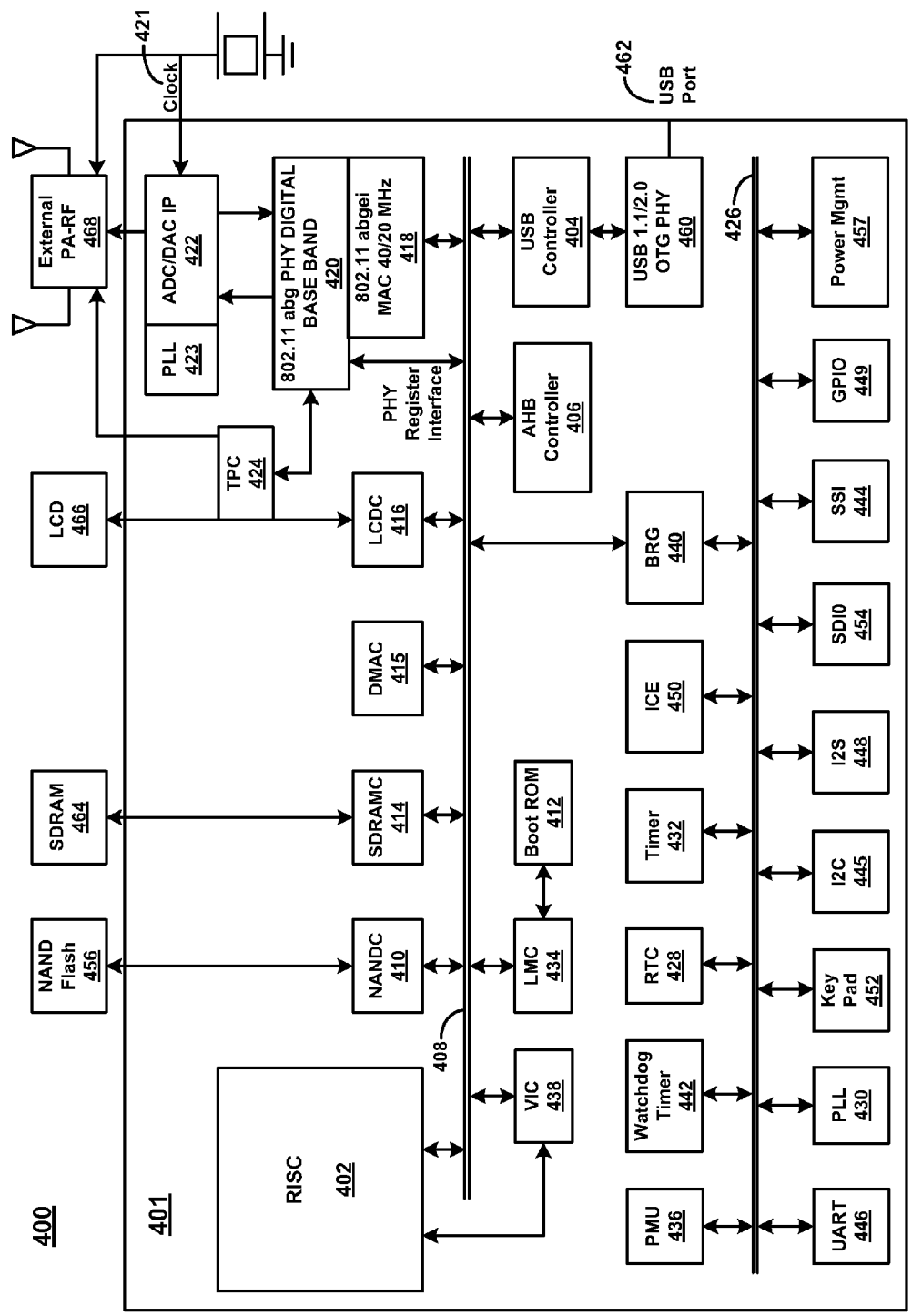
FIG. 4 illustrates a block diagram of a voice over wireless local area network (VoWLAN) communication device including a single RISC microprocessor, in accordance with another embodiment of the present invention.

FIG. 4 illustrates a block diagram of a VoWLAN communication device 400 including a single RISC microprocessor 402, in accordance with another embodiment of the present invention. VoWLAN Communication device 400 includes VoWLAN SoC 401, which operates in a similar manner as VoWLAN SoC 300 of FIG. 3 to provide voice processing and control functionality without a separate DSP microprocessor. VoWLAN SoC 401 includes two buses, a high-speed bus 408, e.g., operating at 66 MHz, and a peripheral bus 426, e.g., operating at 33 MHz.

VoWLAN SoC 401 includes NAND memory controller (NANDC) 410 which may be coupled to external flash memory (e.g., NAND Flash 456), SDRAM controller (SDRAMC) 414 which may be coupled to external SDRAM 464, direct memory access controller (DMAC) 415, liquid crystal display controller (LCDC) 416 which may be coupled to LCD display 466, local memory controller (LMC) 434 that is coupled to boot ROM 412, high speed bus (AHB) controller 406, Universal Serial Bus (USB) controller 404 coupled to USB (e.g., USB 1.1 or USB 2.0) On-The-Go (OTG) PHY 460, which may be coupled to external USB port 462, and Vector Interrupt Controller (VIC) 438, which communicate over high speed bus 408.

VoWLAN SoC 401 also includes power management (PMU) 436, watchdog timer 442, real-time clock (RTC) 428, timer 432, In-Circuit Emulator (ICE) module 450, Universal Asynchronous Receiver-Transmitter (UART) 446, phase-locked loop (PLL) 430, key pad 452, Serial Synchronous Interface (SSI) 444, Inter-Integrated Circuit (I2C) communication interface 445, Inter-Integrated Circuit Sound (I2S) 448, general purpose I/O (GPIO) 449, secure digital I/O (SDIO) 454, and power management 457, which communicate over peripheral bus 426. SSI 444, I2C interface 445, UART 446, I2S 448, SDIO 454, and GPIO 449, may be coupled to external devices, e.g., a voice headset. It should be appreciated that the voice headset may be any device operable to receive and render voice communication.

High speed bus 408 and peripheral bus 426 are communicatively coupled over bus bridge (BRG) 440. The operations of various components of VoWLAN communication device 400 are understood by those of skill in the art. These components are not described herein so as to not obscure the embodiments described herein.

In one embodiment, RISC microprocessor 402 is operable to perform all necessary operations associated with VoIP communication, including digital signal processing and control functions. In particular, RISC microprocessor 402 does not require the use of a dedicated DSP to perform signal processing. RISC microprocessor 402 is configured to provide all voice processing and control functionality for operation of VoWLAN communication device 400. In one embodiment, RISC microprocessor 402 includes a data cache (D-cache) for caching data and an instruction cache (I-cache) for caching instructions.

VoWLAN communication device 400 is operable to provide VoIP communication over an IP network over a wireless connection using a wireless baseband and external radio 468. In one embodiment, VoIP traffic transmitted through radio 468, both in transmission and reception, are controlled by PHY device 420, MAC device 418, and ADC/DAC interface (I/F) 422. PHY device 420, MAC device 418, and ADC/DAC I/F 422 may be collectively referred to herein as a wireless baseband module. In one embodiment, ADC/DAC I/F is controlled by clock signal 421, e.g., 40 MHz, and includes PLL 423. In one embodiment, MAC device 418 is a hardware device that is configured to perform real-time voice communication functions independent of RISC microprocessor 402. In one embodiment PHY device 420 is an 802.11abg PHY digital baseband device. In one embodiment, MAC device 418 is an 802.11abgei MAC 40/20 MHz device. One embodiment of the operation of MAC device 418 is described in FIG. 5.

Figure 5:
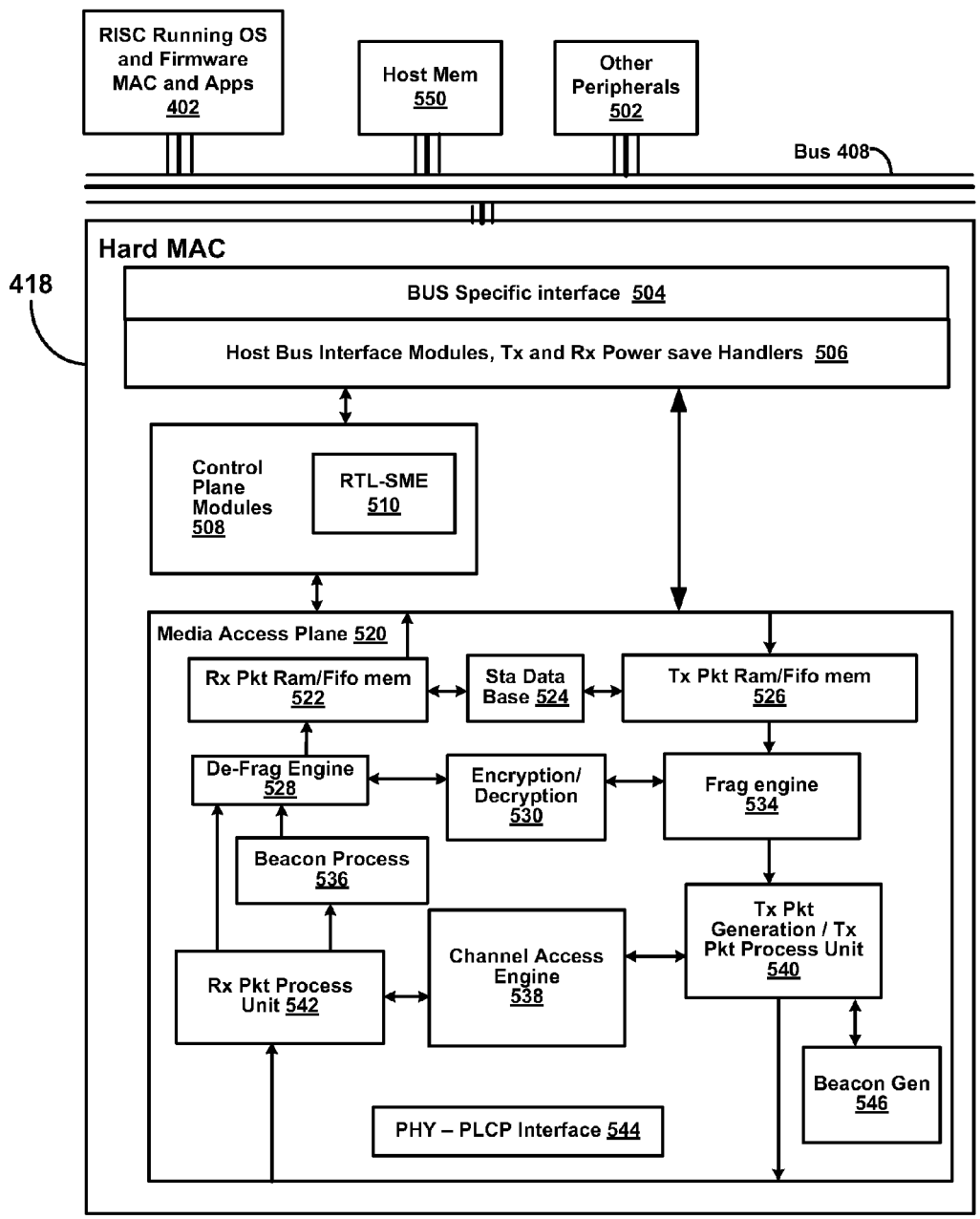
FIG. 5 illustrates a block diagram of hardware-centric medium access control (MAC) device, in accordance with one embodiment of the present invention.

FIG. 5 illustrates a block diagram of hardware-centric MAC device 418, in accordance with one embodiment of the present invention. It should be appreciated that hardware-centric MAC device 418 may used as MAC device 365 of FIG. 3, MAC device 865 of FIG. 8, and the MAC device of WLAN transceiver 925 of FIG. 9. As shown, MAC device 418 is communicatively coupled to RISC microprocessor 402, host memory 550, (e.g., SDRAM 464), and other peripherals 502, e.g., LCD display 466, over high speed bus 408. In the present embodiment, MAC device 418 is implemented as a hardware device configured to perform real-time voice communication functions independent of RISC microprocessor 402. In one embodiment, RISC microprocessor 402 includes a MAC driver for controlling configuration settings of MAC device 418. For example, the MAC driver allows for the configuration of channel selection, data transfer parameters, and other functions that do not occur during WLAN communication. In particular, in the present embodiment, the MAC driver does not wake RISC microprocessor 402 during WLAN communications. In one embodiment, most of the data processing blocks of MAC device 418 are implemented in hardware and a thin control logic runs on the RISC microprocessor 402 making MAC processing of the received and transmitted voice packets decoupled from the microprocessor for all practical purposes.

In particular embodiments, MAC device 418 is configured to provide wireless communication at very high data rates, e.g., 108 MBPS. In order to provide data transfer at increased data rates while not increasing cycle consumption of RISC microprocessor 402, MAC device 418 operates independent of RISC microprocessor 402. MAC device 418 provides real-time MAC functionality into the gate logic. All hard real-timing requirements, such as Short Inter-Frame Space (SIFS), Distributed Inter-Frame Space (DIFS), AIFS arbitration inter-Frame space and Point Co-ordination Inter-Frame Space (PIFS) timing requirements are handled entirely by MAC that is implemented in the gate logic, also referred to herein as real-time logic (RTL).

MAC device 418 includes bus specific interface 504 for interfacing with high speed bus 408 and host bus interface modules 506. For example, embodiments bus specific interface 504 may include, but are not limited to a Peripheral Component Interconnect (PCI)/Advanced High-performance Bus (AHB) interface, a Direct Memory Access (DMA) interface, a slave interface, or another type of interface. Host bus interface modules 506 include transmit ($T_x$) and receive ($R_x$) power save handlers (e.g., for user configurability).

MAC device 418 also includes control plane modules 508 for providing control functions of MAC device 418 and hardware media access plane 520 communicatively coupled to control plane modules 508 and for performing real-time data communication functions independent of RISC microprocessor 402. In particular embodiments, media access plane 520 is operable to handle operations having high real-timing requirements. For example, media access plane is operable to handle all operations having requirements on the order of microseconds. In particular embodiments, control plane module 508 is operable to handle less stringent timing requirements, e.g., on the order of tens of milliseconds. By placing a lesser processing burden on the control plane modules 508, in particular embodiments, control plane modules 508 may be implemented in software, firmware, hardware or any combination thereof.

In particular embodiments, where at least a portion of control plane 508 is implemented as software, the portion of control plane 508 may be implemented in programmable hardware, e.g., programmable logic. By implementing at least a portion of control plane modules 508 as programmable hardware, programmable registers of the programmable hardware can be used to account for any potential interoperability or extensibility problems resulting from interrupt conflicts. Using programmable hardware allows for solving real-time operating constraints in a system using a single microprocessor while stile maintaining a hardware-centric MAC 418 that is configurable to support interoperability or extensibility.

Control plane modules 508 provide RTL-based control plane module implementation for a number of features as defined by Institute of Electrical & Electronics Engineers (IEEE) standards. These features may include, but are not limited to, legacy power save, APSD power save features. In one embodiment, control plane modules 508 are configurable such that features implemented by control plane modules 508 may be moved to software and/or firmware, with minimal changes to RTL code. In one embodiment, control plane modules may be implemented in programmable hardware. Control plane modules 508 includes RTL implemented Station Management Entity (SME) 510, which is configured to monitor and optionally initiate various power save features.

Media access plane 520 of MAC device 418 provides real-time MAC functionality. In one embodiment, media access plane 520 is implemented in gate logic, e.g., RTL, such that real-timing requirements of MAC device 418 are handled in gate logic. Media access plane 520 includes receive packet memory 522 and transmit packet memory 526. In one embodiment, receive packet memory 522 and transmit packet memory 526 are implemented as RAM memory using First In, First Out (FIFO) storage.

In one embodiment, MAC device 418 performs polling of stations in IBSS mode without the intervention of firmware for tracking information such as the Announcement Traffic Indication Message (ATIM) period. MAC device 418 also provides for RTL controlled packet transfer when a station responds for ATIM polls for IBSS.

MAC device 418 comprises fragmentation engine 534 for providing real-time fragmentation without requiring intervention of software at the MAC Protocol Data Unit (MPDU) level. MAC device 418 also comprises de-fragmentation engine 528 for providing real-time reassembly without requiring intervention of software at the MPDU level. Encryption/decryption engine 530 is operable to provide on-the-fly encryption/decryption with RTL based Key Retrieval merged with on-the-fly fragmentation and reassembly of fragmentation engine 534 and de-fragmentation engine 528, respectively.

Beacon process module 536 and beacon generation module 546 provide beacon synchronization and generation of timing based on a hardware 64 bit clock. In one embodiment, beacon process module 536 is also configured to perform beacon filtering after join in response to a request by software. In particular embodiments, beacon process module 536 is operable to receive packets from packet process unit 542 and to filter out unwanted packets, e.g., non-beacon packets, in hardware. For example, in particular embodiments, the filtering of unwanted packets is performed without requiring the use of other components of MAC device 418 and without requiring the use of RISC microprocessor 402.

In particular embodiments, beacon process module 536 is operable to deactivate after processing a packet and to activate in advance of receipt of a packet. In particular embodiments, beacon process module 536 is operable to reactivate prior to receipt of a packet by a time at least long enough to account for clock drift.

MAC device 418 comprises channel access engine 538 for providing channel access mechanisms. Channel access engine 538 is operable to provide Contention Period (CP) Access, such as CP with Distributed Coordination Function (DCF), and Hybrid Co-ordination Function with Hybrid coordination function (HCF) controlled channel access (HCCA). MAC device 418 also includes receive packet process unit 542 and transmit packet generation/transmit packet process unit 540. Physical Layer Conversion Protocol (PLCP) interface 544 provides an interface between MAC device 418 and PHY device 420 of FIG. 4.

Hardware MAC device 418 implemented in RTL provides many functional and operation advantages. MAC device 418 reduces the Million Instructions Per Second (MIPS) requirement of VoWLAN SoC 401. For instance, the peak MIPS required to process the time critical Interrupt Service Routines (ISRs) is reduced to process those events. In one embodiment, the processing of the ISRs adheres to SIFS, DIFS, back-off, Extended Interframe Space (EIFS), Arbitration Interframe Space (AIFS) timing requirements etc. Furthermore, the reduced numbers of interrupts per second and the reduced number of types of interrupts simplifies software architecture.

In one embodiment, MAC device 418 obviates the need for spending MIPS on fragmentation/reassembly, since fragmentation and reassembly is performed by the RTL. Software operating on RISC microprocessor 402 configures the MAC Service Data Unit (MSDU) packet and process of the fragmentation and reassembly occurs opaque to firmware.

Moreover, by implanting encryption and decryption in RTL, RISC microprocessor 402 does not need to perform encryption/decryption. Furthermore, since the encryption/decryption is on-the-fly, firmware MIPS are saved while moving the data packets back and forth from the encryption/decryption engines. Also, since encryption is on-the-fly, system firmware/software complexity is reduced in terms of number interrupts for co-coordinating encryption/decryption engines for receive as well as transmit packets.

With reference to FIG. 4, in one embodiment, VoWLAN SoC 401 includes transmit power control (TPC) 424 for proactively controlling power to reduce power dissipation while in transmit mode. Excessive power dissipation is a problem typically found in WLAN-enabled portable devices that are powered from built-in batteries. Excessive power drain reduces effective up-time of these devices. It should be appreciated that transmit power control 424 may be integrated into any WLAN-based SoC architecture for yielding significant reduction in transmit power yet not compromising over-all throughput, and is not limited to the present embodiment. In one embodiment, transmit power control 424 is tailored for voice traffic in a VoWLAN scenario, however transmit power control 424 can be applied to data and video as well without any loss of generality.

Transmit power control 424 is operable to establish a reference operating point and tracks the reference point over the entire session. Transmit power control 424 gets inputs from the receiver chain when VoWLAN SoC 401 is in receive mode and uses these inputs to determine the combination of the best 3-tuple operating point (transmit_power, data_rate, transmit_antenna) for a given transmit payload.

In one embodiment, transmit power control 424 uses periodicity of the VoIP based packets to monitor the operating reference point. Transmit power control 424 has two modes of operation, active and stand-by, corresponding to a two-way voice call and stand-by mode of the WLAN, respectively. The operation of transmit power control 424 is based on the following observations:

1. Channel reciprocity between Access Point (AP) and Station (STA)
2. Channel varies slowly with time, e.g., a very low Doppler (>100 msec).
3. Noise figure is more or less same in all devices (5 to 7 dB).

In the active mode, the transmit power control 424 tracks and controls the transmit power for each VoIP packet over WLAN at the same time makes a decision on the data rate and which antenna to be used yielding the least power drain from the battery.

In one embodiment, transmit power control 424 establish a reference operating point (transmit_power, tx_data_rate, transmit_antenna) with a given AP while getting associated.

The Signal to Noise ratio (SNR) is then computed from the received signal (from the given AP). A delay spread of the channel is estimated from the received signal (from the given AP). The best received antenna giving maximum signal strength for the given AP is found. The minimum SNR needed for the packet to be decoded successfully at the AP at the reference data rate for a given payload is estimated, which is required for the next transmit.

The transmit power needed to meet the minimum SNR requirement is calculated. The minimum SNR and transmit power are recalculated with immediate upper and lower data rates from the reference data rate. The optimal combination of rate and transmit power which drains minimum battery energy is determined. The packet is transmitted with the optimal transmit power and rate.

An acknowledgement (ACK) is received. The ACK is used to compute the SNR, the delay spread, and to determine the best received antenna giving maximum signal strength for the given AP. The reference operating point is updated with the parameters of the last transmit packet. The packet is re-transmitted with next lower rate with same power if no ACK is received. The SNR, the delay spread, and the best received antenna giving maximum signal strength for the given AP are updated based on the received VoIP packet.

The reference estimates are refreshed each time a successful transmit happens, which transmit power control 424 tracks through successful reception of the ACK. The periodic nature of the voice traffic ensures that the reference typically gets updated every 20 or 30 msec, depending on the type of speech coder selected.

In stand-by mode, the transmit power control 424 wakes up periodically (e.g., controlled by a heart-beat module) to receive beacon and refreshes the reference receive parameters, which is 3-tuple (rx_signal_strength, rx_data_rate, rx_antenna). In one embodiment, transmit power control 424 wakes up periodically with every beacon or as directed by the heart-beat module. In particular embodiments, transmit power control 424 may wake up when beacon process module 536 of FIG. 5 is woken up for processing a beacon. The SNR and signal strength are estimated from the received beacon. The delay spread of the channel is estimated from the received beacon. The best received antenna giving maximum signal strength for the given AP is determined. The reference receive parameters are updated with the latest successful match receive, e.g., a 32 bit Cyclic Redundancy Checksum (CRC-32).

In one embodiment, when VoWLAN SoC 401 enters into the active mode either by a trigger from the application processor with an intension of VoIP packet transmit or triggered by a traffic information map (TIM) in the beacon, transmit power control 424 derives 3-tuple reference operating point from the 3-tuple reference receive parameters by determining the optimal transmit data rate and power for the given payload from the reference receive power and delay spread. The transmit antenna is set to the same as that of the reference receive parameter. The transmit_power, data_rate and antenna are set as the reference operating point upon a successful transmit.

Figure 6:
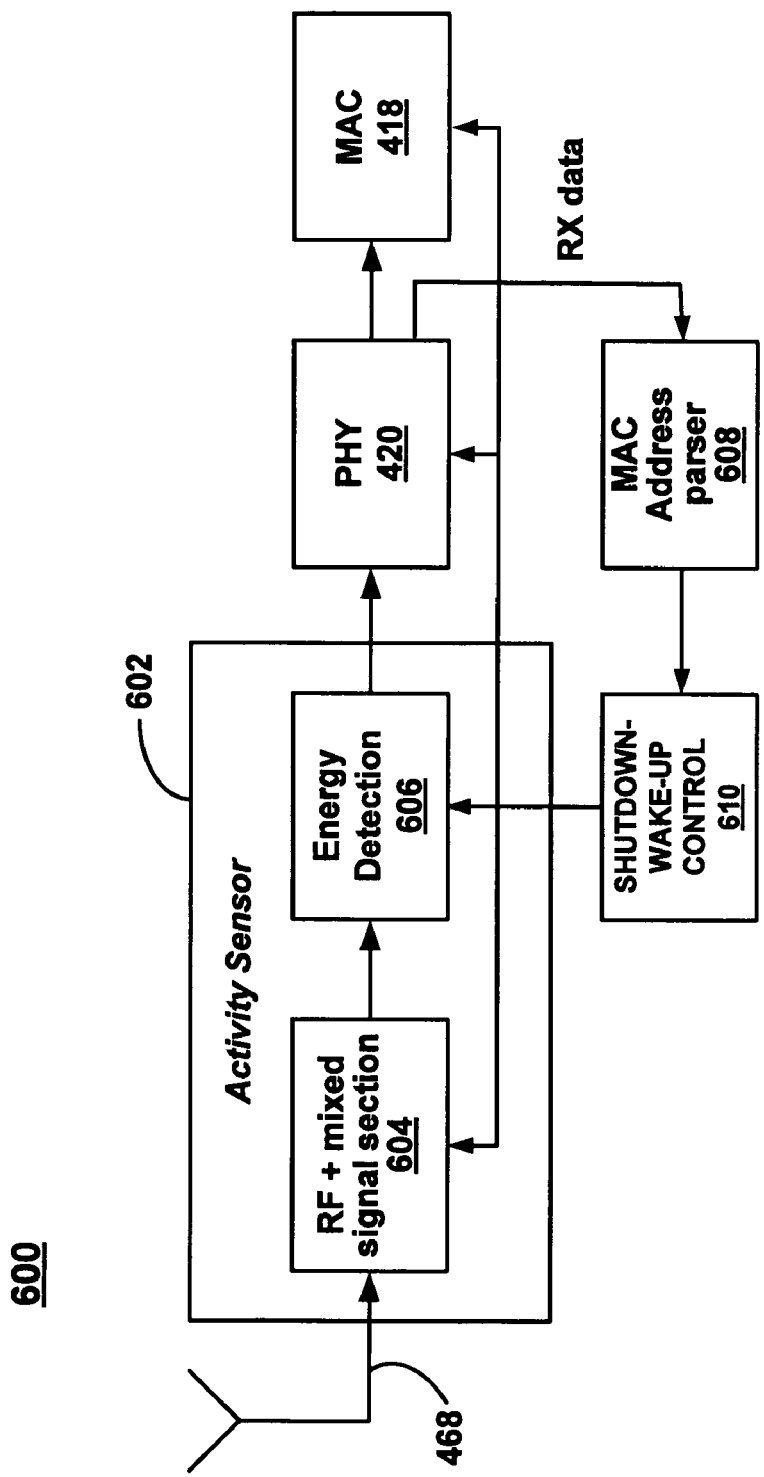
FIG. 6 illustrates a block diagram depicting components of a VoWLAN communication device used for proactive power control, in accordance with one embodiment of the present invention.

FIG. 6 illustrates a block diagram 600 depicting components of a VoWLAN communication device used for proactive power control, in accordance with one embodiment of the present invention.

Conventional WLAN implementations require a PHY layer to decode all detected packets and deliver the payload to the MAC layer. In an infrastructure mode, an AP delivers the packets to the intended stations. In such a scenario a majority of the packets decoded are actually not intended for the wireless STA. This results in excessive power drain in decoding un-intended traffic.

WLAN is used to deliver packetized voice to the end-user over wireless 'hot-spots'. In one embodiment, VoWLAN communication device 400 is implemented on a battery-powered hand-held device, requiring power efficiency to increase talk time and standby time of device 400. In one embodiment, VoWLAN SoC 401 is configured to perform passive listening to save power during the presence of un-intended traffic.

In performing passive listening, PHY device 420 is partly aware of MAC functionality and discards unintended traffic before waking up MAC device 418. Radio 468 is operable to receive signals, e.g., RF and/or mixed signals. Activity sensor 602 comprises RF and mixed signal module 604 and energy detection module 606 for sensing activity received over radio 468. RF and mixed signal 604 and energy detection module 606 are the only components illustrated in FIG. 6 that are turned on by default. RF and mixed signal 604 and energy detection module 606 are configured to sense the presence of activity on the channel. It should be appreciated that all other PHY and MAC modules are in shutdown.

In one embodiment, activity sensor 602 is operable to sense a silence-to-energy event. This ensures PHY device 420 is not triggered when the WLAN wakes up in the middle of a packet on-the-air, but only gets activated when silence gets detected at the end of current packet followed by another packet on-the-air activating energy detection (ED). If activity is detected, then ED module 606 triggers PHY device 420 for further processing.

PHY device 420 starts decoding the packet. The decoded bytes are passed on to MAC address parser module 608. In one embodiment, the decoded bytes passed on to MAC address parser module 608 includes at least a header block of the packet. In particular, MAC address parser module 608 receives the decoded bytes before waking up MAC 418. PHY device 420 is "MAC aware" such that MAC address parser module 608 knows the MAC address of the STA. MAC address parser module 608 parses the decoded bytes for this address. If a match is detected, PHY device 420 wakes up MAC device 418. Alternatively, if a match does not occur, then activity sensor 602, PHY device 420 and MAC address parser module 608 are put in shutdown mode until the end of the unintended packet. In particular embodiments, shutdown/wake-up control 610 controls the shutdown (e.g., deactivation) and wake-up (e.g., activation) of at least one of activity sensor 602, PHY device 420 and MAC address parser module 608. These components are placed in shutdown by using the information of packet duration, which PHY device 420 decodes in the header and uses only if header-check (e.g., CRC-16) passes. Shutdown/wake-up control 610 automatically wakes up activity sensor 602 at the end of the unintended packet.

In particular embodiments, in active mode, passive listening makes sure MAC device 418 gets activated when a beacon (broadcast), RTS-CTS (request to send and clear to send), multi-cast or uni-cast packet arrives. In one embodiment, management or control packets from the associated AP are always decoded. This ensures correct functioning of the virtual carrier sensing mechanism and station management present inside MAC device 418. This ensures shutting down of the application processor, e.g., RISC microprocessor 402, and core hardware MAC device 418 for longer duration and saving power.

In standby mode, when the WLAN wakes up periodically to look for beacon, RF and mixed signal module 604 has to wake up in advance to take care of the RF and PLL delay, and to make sure beacon is not missed due to the drift in the real time clock (RTC), e.g., a 32.768 kHz real time clock. This over-all time period by which various components, e.g., the RF, PLL, ADC, etc., have to wake up can be as long as 5 msec or more depending on the extent of clock drift. Passive listening filters out all unwanted packets without switching on all components of MAC device 418 and the RISC microprocessor 402 while waiting for beacon arrival. In particular embodiments, beacon process module 536 and packet process unit 542 are activated to perform the beacon processing. Also, while in standby, the RISC microprocessor can be totally in sleep as beacon processing can entirely be done in hardware MAC and thereby saving lot of power in frequent wake-up and shutting down the processor core. In particular embodiments, MAC device 418 is shut down after performing beacon processing.

FIGS. 7A, 7B, 7C and 7D are flow charts illustrating processes 700, 730, 750 and 770, respectively, for providing VoWLAN communication using a single microprocessor, in accordance with an embodiment of the present invention. In one embodiment, processes 700, 730, 750 and 770 are carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in processes 700, 730, 750 and 770, such steps are exemplary. That is, the embodiments of the present invention are well suited to performing various other steps or variations of the steps recited in FIGS. 7A, 7B, 7C and 7D. In particular embodiments, processes 700, 730, 750 and 770 are performed by a VoWLAN communication device, e.g., VoWLAN SoC 300 of FIG. 3 or VoWLAN communication device 400 of FIG. 4.

Figure 7A:
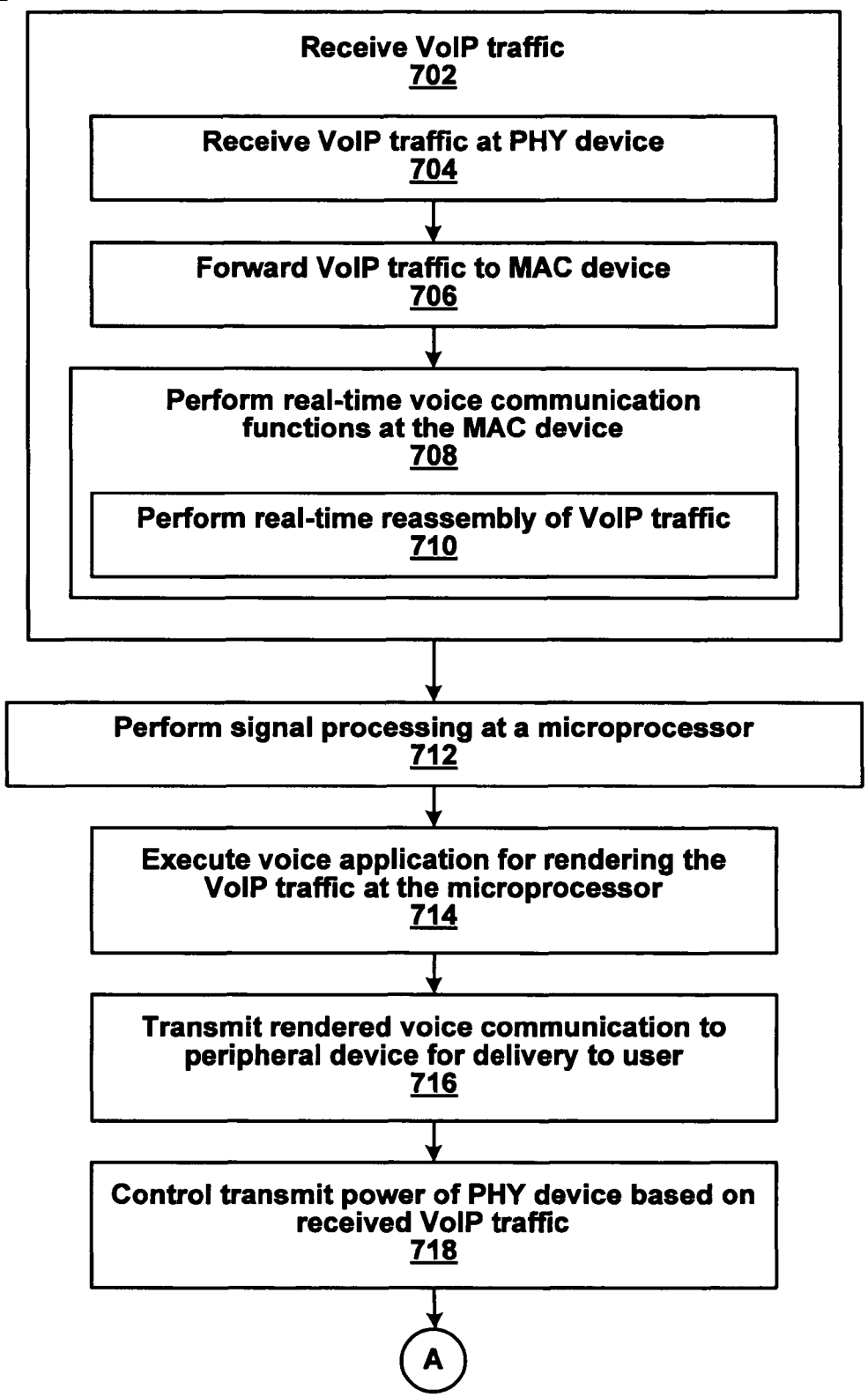
FIGS. 7A, 7B, 7C and 7D are flow charts illustrating processes for providing wireless communication using a single microprocessor, in accordance with an embodiment of the present invention.

Process 700 of FIG. 7A illustrates steps for receiving VoW-LAN communications at a voice communication device including a single processor. At step 702, VoIP traffic is received at a voice communication device of a wireless connection from a WLAN. In one embodiment, as shown at step 704, the VoIP traffic is received at a PHY device, e.g., PHY device 420 of FIG. 4, of the wireless transceiver. In one embodiment, a method of performing passive listening performed in conjunction with the PHY device is provided. Passive listening is performed prior to waking a MAC device of the wireless transceiver.

Figure 7B:
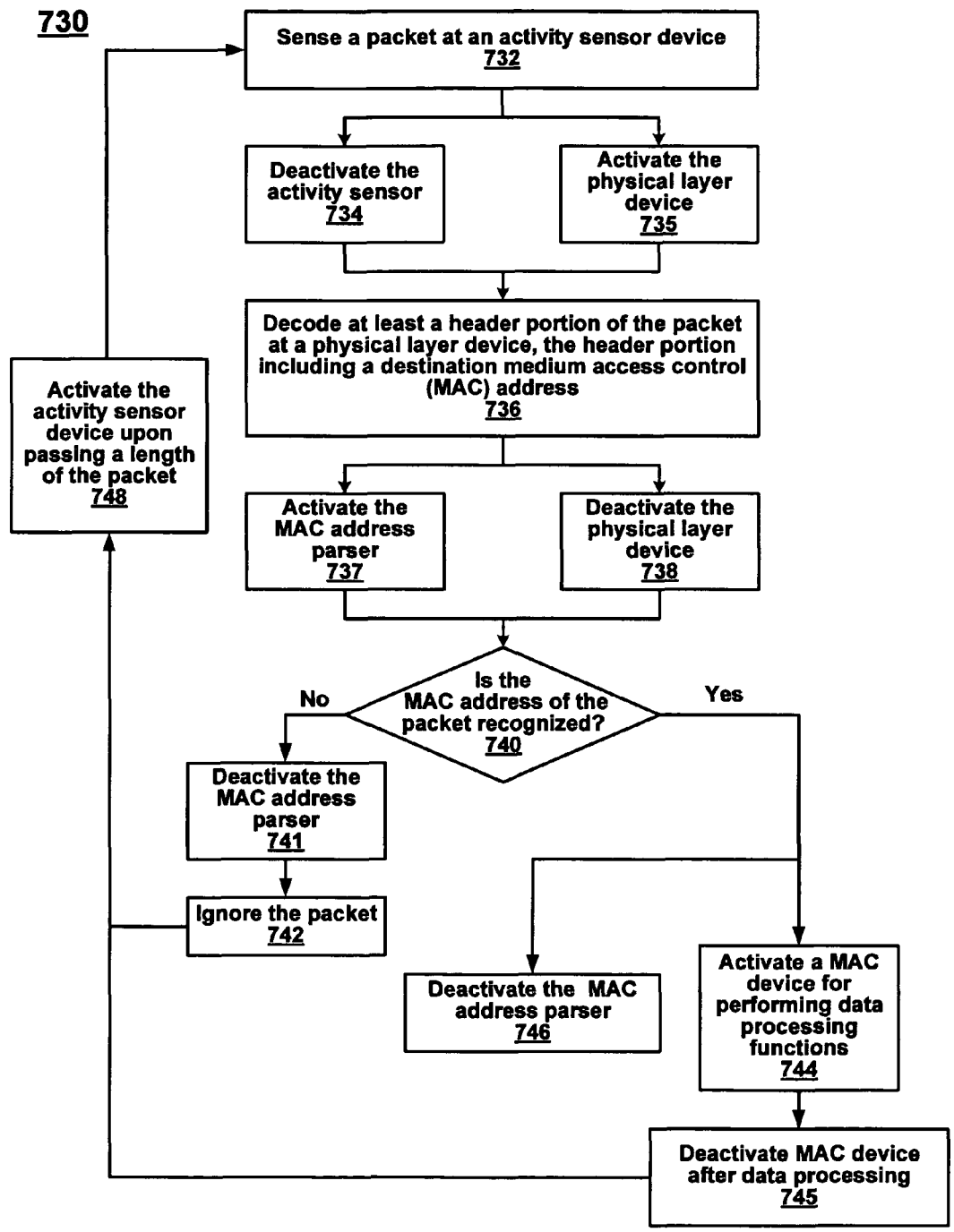

With reference to FIG. 6 and FIG. 7B, steps in a process 730 for performing passive listening are illustrated. At step 732, a packet is sensed at activity sensor device 602. In a particular embodiment, as shown at step 734, activity sensor device 602 is deactivated subsequent sensing the packet. In one embodiment, activity sensor device 602 is deactivated for at least a length of said packet. In a particular embodiment, as shown at step 735, PHY device 420 is activated subsequent sensing the packet for receiving the packet. It should be appreciated that steps 734 and 735 may be executed in series, in parallel, or overlapping. At step 736, at least a header portion of the packet is decoded at PHY device 420, where the header portion includes a destination medium access control (MAC) address. In a particular embodiment, as shown at step 737, MAC address parser 608 is activated subsequent decoding the header portion of the packet. In a particular embodiment, as shown at step 738, PHY device 420 is deactivated subsequent decoding the header portion of the packet. It should be appreciated that steps 737 and 738 may be executed in series, in parallel, or overlapping.

At step 740, it is determined whether the MAC address of the packet is recognized at MAC address parser 608. For example, it is determined whether the MAC address of the packet is the MAC address of the receiving device (e.g., STA). In one embodiment, a packet is recognized if the MAC address of the packet matches the MAC address associated with the VoWLAN communication device receiving the packet.

In one embodiment, if the MAC address is not recognized, as shown at step 741, MAC address parser 608 is deactivated. At step 742, the packet is ignored. In response to recognizing a MAC address of the packet, as shown at step 744, MAC device 418 is activated for performing data processing functions, such that MAC device 418 is not activated if the MAC address is not recognized. At step 745, in a particular embodiment, MAC device 418 is deactivated after data processing. In one embodiment, if the MAC address is recognized, as shown at step 746, MAC address parser 608 is deactivated. At step 748, activity sensor device 602 is activated upon the passing of the length of the packet. In one embodiment, process 730 proceeds to step 732 to sense a subsequent packet.

With reference to FIG. 7A, in one embodiment, as shown at step 704, the VoIP traffic is received at a PHY device, e.g., PHY device 420 of FIGS. 4, of the wireless transceiver. In one embodiment, a method of hardware-based beacon processing is provided. In a particular embodiment, the hardware-based beacon processing is performed in conjunction with a beacon processing module (e.g., beacon process module 536 of FIG. 5). Hardware-based beacon processing is performed without requiring the use of other components of the MAC device and without requiring the use of a microprocessor.

Figure 7C:
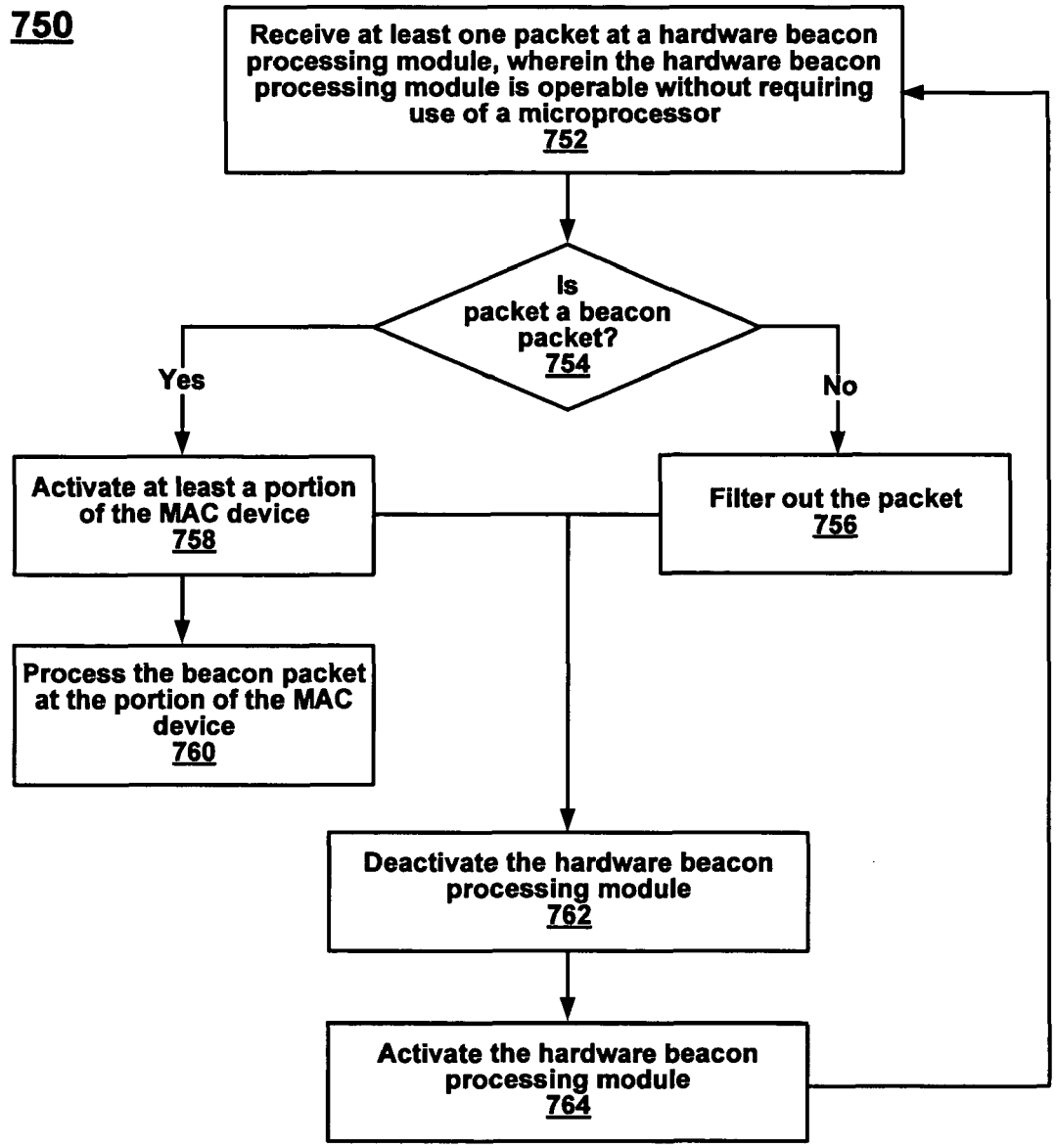

With reference to FIG. 7C, steps in a process 750 for hardware-based beacon processing are illustrated. At step 752, at least one packet is received at a hardware beacon processing module, in which the hardware beacon processing module is operable without requiring use of a microprocessor. At step 754, it is determined whether the packet is a beacon packet. If it is determined that the packet is not a beacon packet, as shown at step 756, the packet is processed by filtering out the packet. If it is determined that the packet is a beacon packet, as shown at step 758, in a particular embodiment, at least a portion of the MAC device is activated. At step 760, the beacon packet is processed at the activated portion of the MAC device. In a particular embodiment, at step 762, the hardware beacon processing module is deactivated after the packet is processed. At step 764, the hardware beacon processing module is activated prior to receiving a subsequent packet. In one embodiment, the hardware beacon processing module is activated by a time at least long enough to account for clock drift.

With reference to FIG. 7A, at step 706, the VoIP traffic is forwarded to a MAC device, e.g., MAC device 418 of FIG. 4. At step 708, real-time voice communication functions are performed at the MAC device independent of the microprocessor. It should be appreciated that the MAC device does not require usage of the microprocessor to perform MAC functionality. In one embodiment, as shown at step 710, the real-time voice communication functions performed at the MAC device independent of the microprocessor include performing real-time reassembly of the VoIP traffic.

At step 712, signal processing of the VoIP traffic is performed at the microprocessor of the voice communication device. At step 714, a voice application for rendering the VoIP traffic is executed at the microprocessor. In one embodiment, the microprocessor is a RISC microprocessor, e.g., RISC microprocessor 402 of FIG. 4. It should be appreciated that signal processing, the voice application and control functions are performed at the microprocessor without the need for a separate DSP or CPU. At step 716, transmitting rendered voice communication to a peripheral device for delivery to a user.

In one embodiment, as shown at step 718, the transmit power of the PHY device is controlled based on received VoIP traffic. In one embodiment, the transmit power is controlled by a transmit power control, e.g., transmit power control 424 of FIG. 4.

Figure 7D:
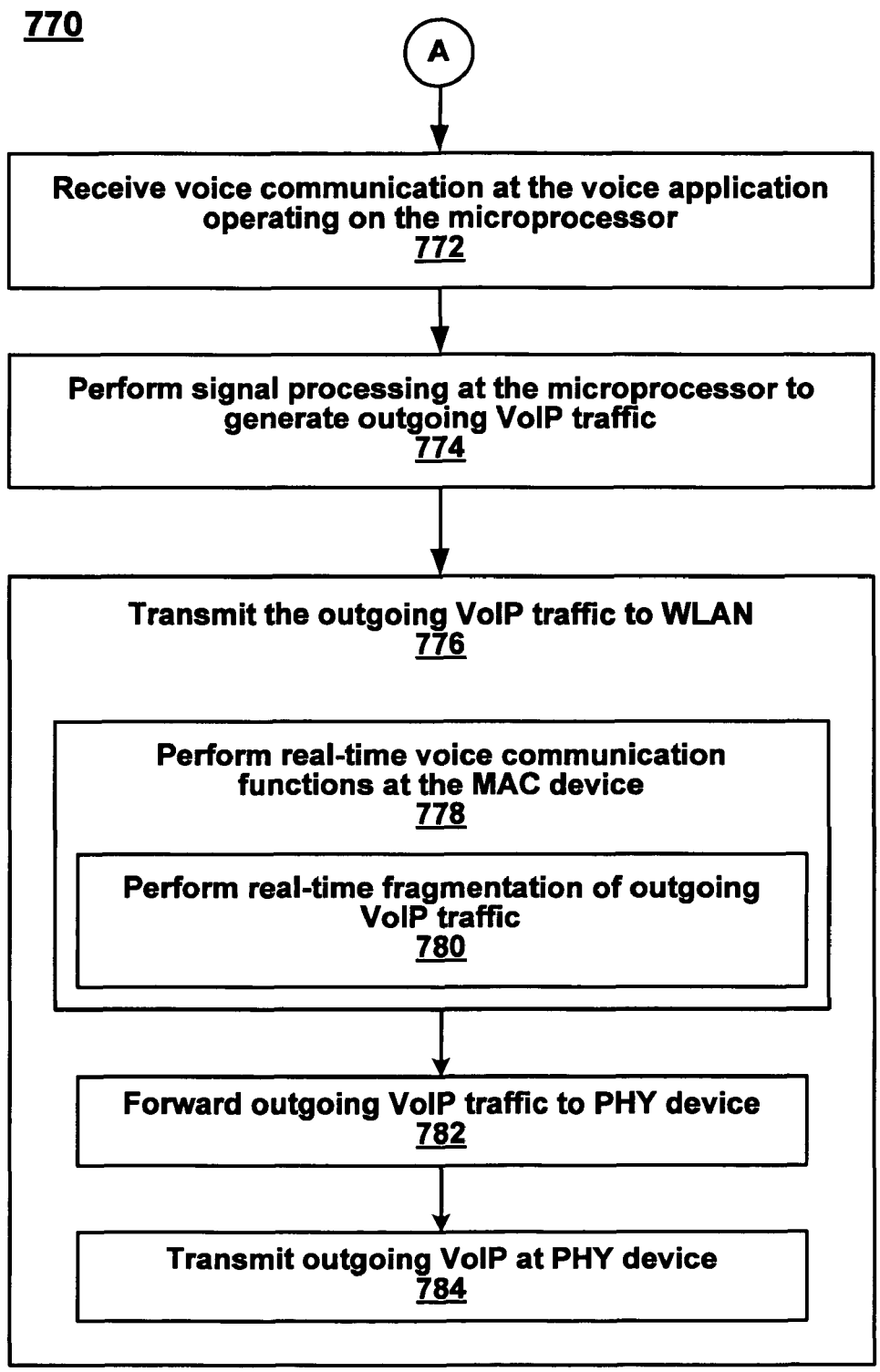

Process 770 of FIG. 7D illustrates steps for transmitting VoWLAN communications at a voice communication device including a single processor. At step 772, voice communication for transmission over the WLAN is received at the voice application. At step 774, signal processing of the voice communication at the microprocessor is performed to generate outgoing VoIP traffic.

At step 776, the outgoing VoIP traffic is transmitted to the WLAN over the wireless connection. In one embodiment, as shown at step 778, real-time voice communication functions are performed at the MAC device independent of the microprocessor. In one embodiment, as shown at step 780, the real-time voice communication functions performed at the MAC device independent of the microprocessor include performing real-time fragmentation of the outgoing VoIP traffic. At step 782, the outgoing VoIP traffic is forwarded to the PHY device for transmission to the WLAN. At step 784, the outgoing VoIP traffic is transmitted at the PHY device.

DSP-Less Cellular/VoWLAN

Figure 8:
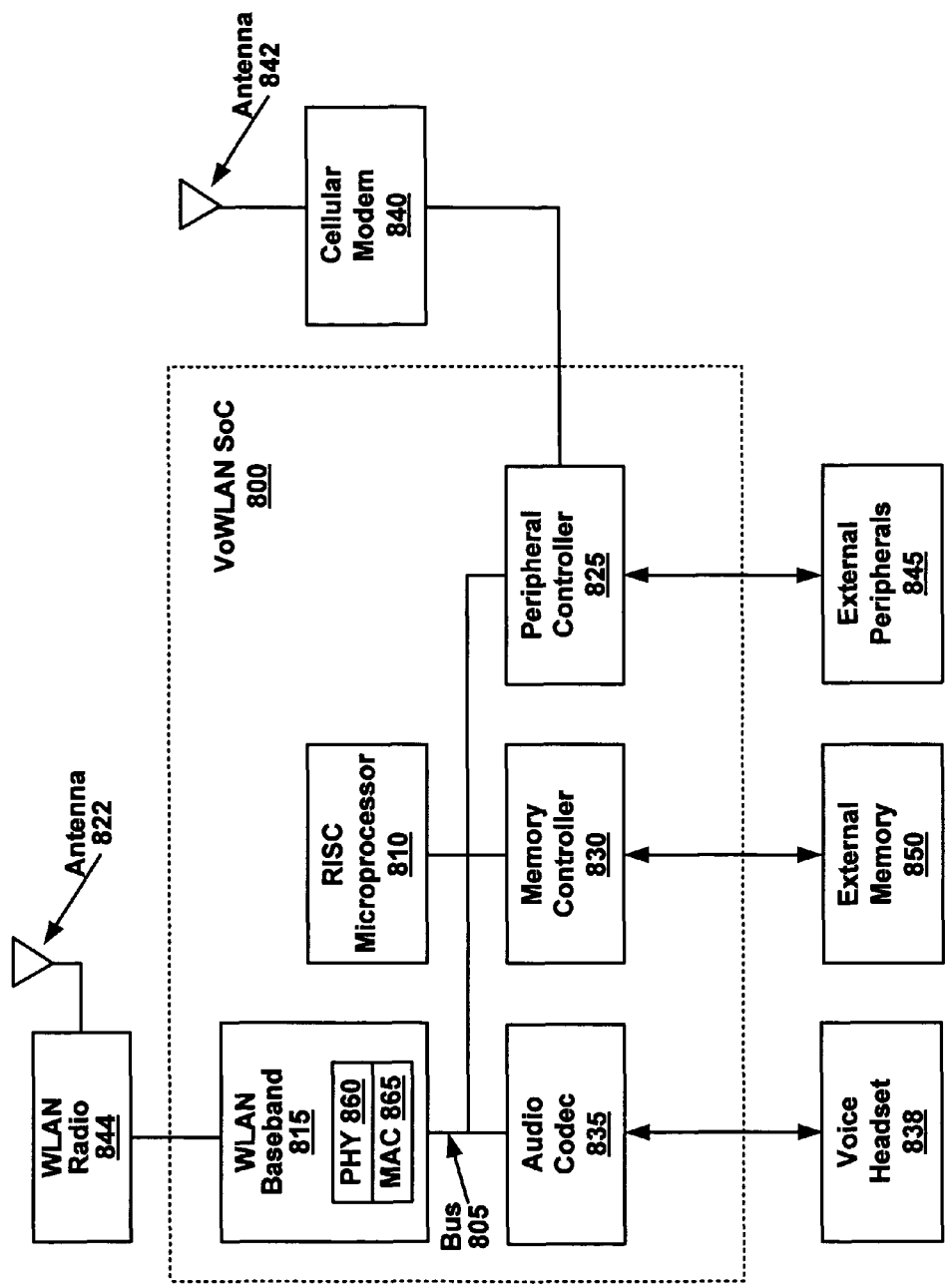
FIG. 8 illustrates a block diagram of a cellular/VoWLAN (CelluLAN) SoC including a single microprocessor, in accordance with one embodiment of the present invention.

FIG. 8 illustrates a block diagram of a cellular/VoWLAN SoC 800, also referred to as CelluLAN SoC 800, including a single microprocessor 810, in accordance with one embodiment of the present invention. CelluLAN SoC 800 includes microprocessor 810, WLAN baseband 815, system peripheral controller 825, system memory controller 830, and audio codec 835, all communicatively coupled over bus 805. It should be appreciated that CelluLAN SoC 800 may include additional components, as understood by those of skill in the art. These additional components are not described herein so as to not obscure the embodiments described herein.

It should be appreciated that bus 805 illustrates that each of the components of CelluLAN SoC 800 are communicatively coupled. However, it should be appreciated that bus 805 can be implemented as a central bus, as shown, individual interconnections between the individual components, or any combination of buses and individual interconnections. In particular, it should be appreciated that bus 805 is not intended to be limited by the shown embodiment.

In one embodiment, microprocessor 810 is operable to perform all necessary operations associated with VoIP and cellular telephone communication, including digital signal processing and control functions for VoIP and baseband processing, including digital signal processing and control functions for processing for cellular communications. In particular, microprocessor 810 is not a dedicated digital signal processor (DSP). In one embodiment, microprocessor 810 is a multi-purpose processor, such as a CPU. In one embodiment, microprocessor 810 is a RISC microprocessor.

It should be appreciated that microprocessor 810 is operable to provide VoIP communications in accordance with the various embodiments described in FIGS. 1 and 2. Moreover, it should be appreciated that microprocessor 810 is operable to provide VoWLAN communications in accordance with the various embodiments described in FIGS. 3, 4, 5, 6, 7A, 7B, 7C and 7D.

WLAN baseband 815 is operable to communicate with an IP network over a wireless connection external WLAN radio 844 comprising using antenna 822, so as to provide VoIP communication over the IP network. In one embodiment, WLAN baseband 815 includes PHY device 860 and MAC device 865. In one embodiment, MAC device 865 is a hardware device that is configured to perform real-time voice communication functions independent of microprocessor 810. One embodiment of the operation of MAC device 865 is described in FIG. 5.

System peripheral controller 825 is communicatively coupled to external system peripherals 845 that include additional components that provide added functionality to CelluLAN SoC 800. System peripheral controller 825 is also communicatively coupled to cellular modem 840. System memory controller 830 is communicatively coupled to external memory 850 for use in operating CelluLAN SoC 800, and may include volatile memory, such as RAM, SRAM, and SDRAM, and non-volatile memory, such as EEPROM, and NOR or NAND. It should be appreciated that external memory 850 may include multiple types of memory, all of which are represented as external memory 850.

Audio codec 835 is operable to encode and decode audio data for use in communicating voice data using VoIP. It should be appreciated that audio codec 835 may be implemented as hardware, software, firmware, or any combination thereof. In one embodiment, audio codec 835 provides for coupling CelluLAN SoC 800 to an external device for rendering the voice communication and for receiving voice communication. In one embodiment, audio codec 835 is coupled to voice headset 838. However, it should be appreciated audio codec 835 may be coupled to many different types of devices and interfaces, including but not limited to FXS interfaces, FXO interfaces, microphones, and speakers.

Cellular modem 840 is operable to receive and transmit cellular communications over a cellular network using antenna 842, so as to provide cellular communication over a cellular network. In one embodiment, cellular modem 840 includes Global System for Mobile Communications (GSM), General Packet Radio Service (GPRS), and Enhanced Data for GSM Evolution (EDGE) functionality for processing for cellular communications. In one embodiment, cellular modem 840 is a hardware device that is configured to perform real-time voice communication functions independent of microprocessor 810. One embodiment of the functional operation of cellular modem 840 is described in FIG. 5.

It should be appreciated that CelluLAN SoC 800 provides for voice communication over a WLAN and a cellular network without requiring the use of a dedicated DSP as well as a general-purpose microprocessor. In particular, CelluLAN SoC 800 is operable to perform voice processing on the general-purpose microprocessor 810 (e.g., a RISC microprocessor). Microprocessor 810 is configured to provide all voice processing and control functionality for operation of CelluLAN SoC 800.

Figure 9:
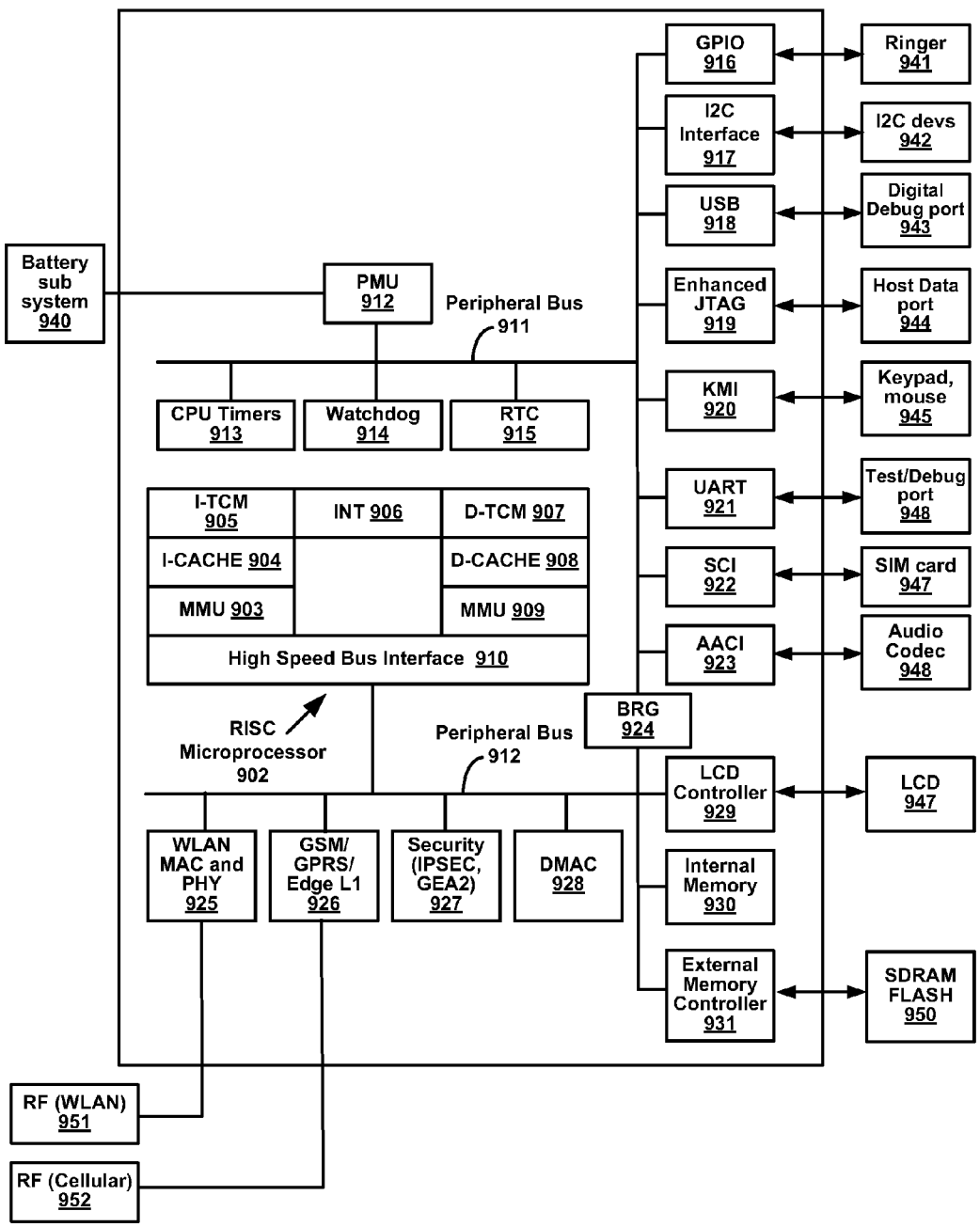
FIG. 9 illustrates a block diagram of a CelluLAN communication device including a single RISC microprocessor, in accordance with another embodiment of the present invention.

FIG. 9 illustrates a block diagram of a CelluLAN communication device 900 including a single RISC microprocessor 902, in accordance with another embodiment of the present invention. CelluLAN communication device 900 includes CelluLAN SoC 901, which operates in a similar manner as CelluLAN SoC 800 of FIG. 8 to provide VoWLAN and cellular telephony functionality where voice processing and control functionality for the VoIP is performed without a separate DSP microprocessor. CelluLAN SoC 901 includes two buses, a high-speed bus 912 and a peripheral bus 911.

CelluLAN SoC 901 includes LCD controller 929 which may be coupled to LCD 949, internal memory 930, external memory controller 931 which may be coupled to external memory 950, such as external flash memory (e.g., EEPROM, NOR Flash, SDRAM, and ASRAM), Direct Memory Access Controller (DMAC) 928, Security Module 927, cellular transceiver 926 which is coupled to cellular RF antenna 952, and WLAN transceiver which is coupled to WLAN RF antenna 951, which communicate over high speed bus 912.

CelluLAN SoC 901 also includes power management unit (PMU) 912 which is coupled to battery subsystem 941, CPU timers 913, watchdog 914, RTC 915, GPIO 916 that may be coupled to ringer 941, I2C interface 917 which may be coupled to I2C devices 942, Universal Serial Bus (USB) interface 918 which may be coupled to digital debug port 943, enhanced Joint Test Action Group (JTAG) interface 919 which may be coupled to host data port 944, keyboard/mouse interface (KMI) 920 which may be coupled to a keyboard and/or mouse 945, Universal Asynchronous Receiver-Transmitter interface 921 which may be coupled to test/debug port 946, Subscriber Identity Module (SIM) card interface (SCI) 922 which may be coupled to SIM card 947, and Advanced Audio Codec Interface (MCI) 923 which may be coupled to audio codec 948, which communicate over peripheral bus 911.

High speed bus 912 and peripheral bus 911 are communicatively coupled over bus bridge (BRG) 924. The operations of various components of CelluLAN communication device 900 are understood by those of skill in the art. These components are not described herein so as to not obscure the embodiments described herein.

In one embodiment, RISC microprocessor 902 is operable to perform all necessary operations associated with VoIP communication, including digital signal processing and control functions, and cellular communication. In particular, RISC microprocessor 902 does not require the use of a dedicated DSP to perform signal processing. RISC microprocessor 902 is configured to provide all voice processing and control functionality for operation of CelluLAN communication device 900. In one embodiment, RISC microprocessor 902 includes Memory Management Units (MMU) 903, I-cache 904, and Instruction Tightly Coupled Memory (I-TCM) 905 for managing instructions, MMU 909, D-cache 908, and D-TCM 907 for managing data, Real time trace support interface (INT) 906, and high speed bus interface 910.

CelluLAN communication device 900 is operable to provide VoIP communication over an IP network over a wireless connection using antenna 951 and to provide cellular communication over a cellular network using antenna 952. In one embodiment, VoIP traffic transmitted through WLAN transceiver 925, both in transmission and reception, are controlled by a PHY device and a MAC device. In one embodiment, the MAC device is a hardware device that is configured to perform real-time voice communication functions independent of RISC microprocessor 902. One embodiment of the operation of an exemplary MAC device is described in accordance with FIG. 5.

CelluLAN communication device 900 is operable to receive and transmit cellular communication at cellular transceiver 926. In one embodiment, cellular transceiver includes a baseband processing module for performing real-time voice communication functions independent of the microprocessor. One embodiment of the functional components of an exemplary baseband processing module is described in accordance with FIG. 10.

Figure 10:
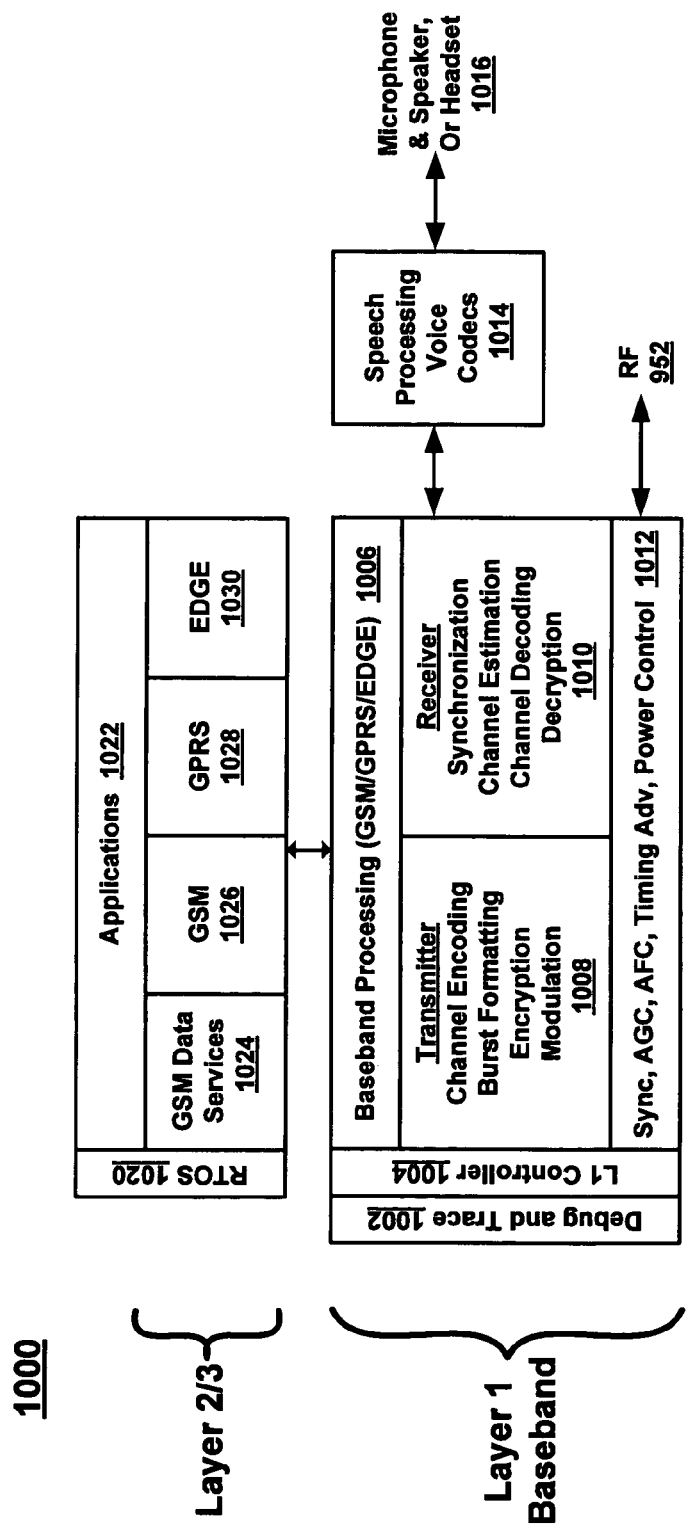
FIG. 10 illustrates a block diagram of a baseband processing module, in accordance with one embodiment of the present invention.

FIG. 10 illustrates a block diagram of a cellular transceiver 1000, in accordance with one embodiment of the present invention. Baseband processing is executed at layer 1 of cellular transceiver 1000. Layer 1 includes debug and trace operation 1002, layer 1 controller 1004, baseband processing module 1006, transmitter 1008, receiver 1010, and additional operations 1012.

In one embodiment, baseband processing module 1006 is compliant with Global System for Mobile Communications (GSM), General Packet Radio Service (GPRS), and Enhanced Data for GSM Evolution (EDGE). In one embodiment, receiver 1010 is configured to perform synchronization, channel estimation, channel decoding, and decryption on incoming voice traffic. In one embodiment, transmitter 1008 is configured to perform channel encoding, burst formatting, encryption, and modulation on outgoing voice traffic. In one embodiment, additional operations 1012 include synchronization, automatic gain control (AGC), automatic frequency control (AFC), timing advancement, and power control. In one embodiment, the layer 1 operations are performed in hardware that is configured to perform real-time voice communication functions independent of RISC microprocessor 902.

Receiver 1010 and transmitter 1008 are communicatively coupled to speech processing voice codecs 1014, for providing voice communication. Speech processing voice codecs 1014 are communicatively coupled to microphone and speaker/headset 1016 for rendering and receiving voice communication. Additional operations 1012 are communicatively coupled to cellular RF antenna 952. Additional operations 1012 are operable to control the performance and operation of cellular RF antenna 952.

Layers 2 and 3 of cellular transceiver 1000 include Real-Time Operating System (RTOS) 1020, applications 1022, GSM data services 1024, GSM 1026, GPRS 1028, and EDGE 1030.

With reference to FIG. 9, in one embodiment, CelluLAN SoC 901 is also operable to provide transmit power control for proactively controlling power to reduce power dissipation while in transmit mode for VoWLAN communications. In one embodiment, the transmit power control is performed as described in accordance with transmit power control 424 of FIG. 4. In one embodiment, CelluLAN SoC includes components for proactive power control of WLAN transceiver. In one embodiment, the proactive power control is performed as described in accordance with FIG. 6 and the accompanying description.

Figure 11:
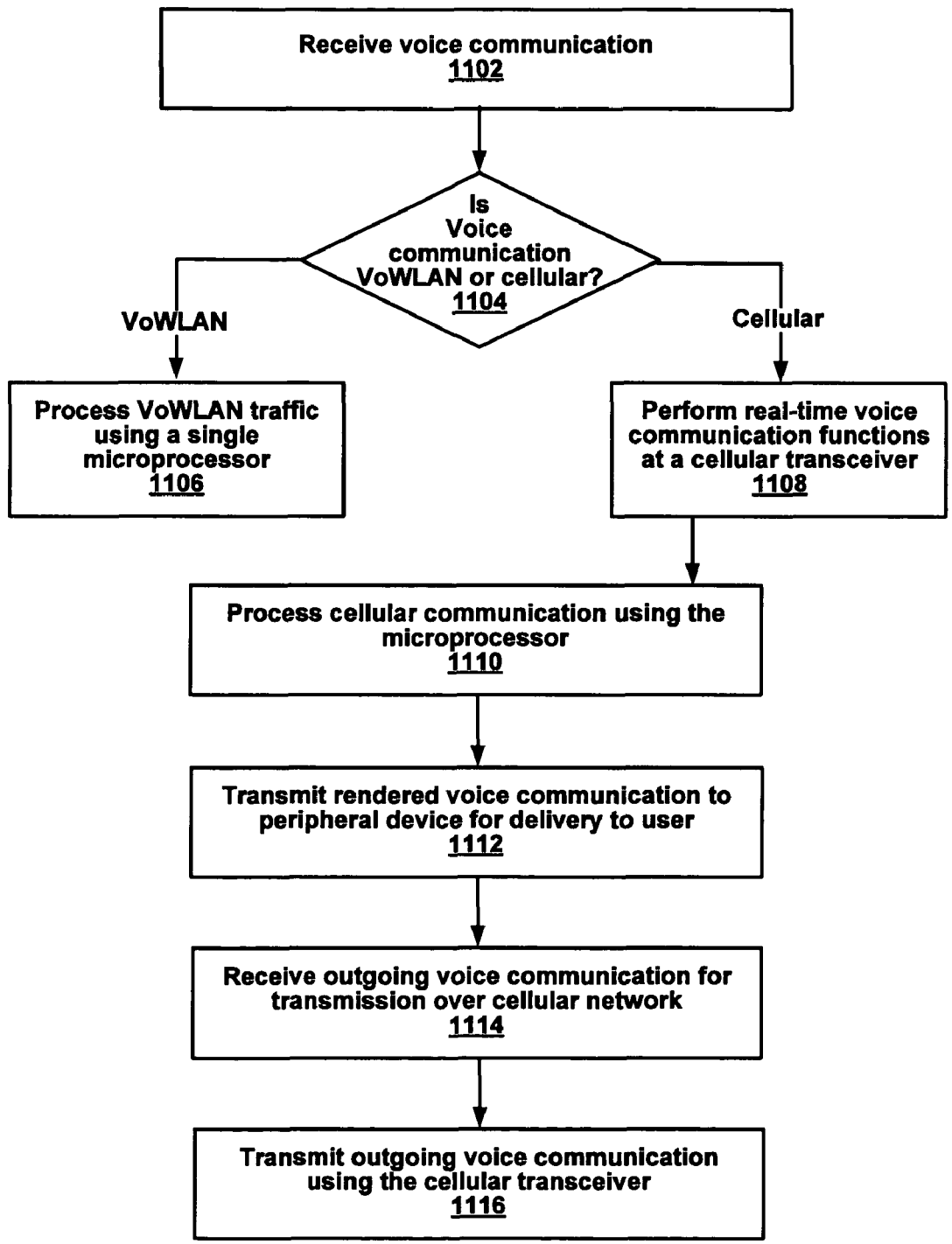
FIG. 11 is a flow chart illustrating a process for providing CelluLAN communication using a single microprocessor, in accordance with an embodiment of the present invention.

FIG. 11 is a flow chart illustrating a process 1100 for providing CelluLAN communication using a single microprocessor, in accordance with an embodiment of the present invention. In one embodiment, process 1100 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in process 1100, such steps are exemplary. That is, the embodiments of the present invention are well suited to performing various other steps or variations of the steps recited in FIG. 11. In one embodiment, process 1100 is performed by a CelluLAN communication device, e.g., CelluLAN SoC 800 of FIG. 8 or CelluLAN communication device 900 of FIG. 9.

At step 1102, voice communication is received at a voice communication device, e.g., CelluLAN communication device 900 of FIG. 9. At step 1 104, it is determined whether the voice communication is VoWLAN communication or cellular communication. If the voice communication is VoIP traffic received from a WLAN, as shown at step 1106, the VoWLAN traffic is processed using a single microprocessor. In one embodiment, the VoIP traffic is processed according to processes 700, 730, 750 and 770 of FIGS. 7A, 7B, 7C and 7D, respectively.

Alternatively, if the voice communication is cellular voice communication received from a cellular network, process 1100 proceeds to step 1108. In one embodiment, as shown at step 1108, the real-time voice communication functions are performed at a cellular transceiver independent of the microprocessor. In one embodiment, the real-time voice communication functions include: synchronizing the voice communication, performing channel estimation on the voice communication, performing channel decoding on the voice communication, and decrypting the voice communication.

At step 1110, the cellular communication is processed using the microprocessor. It should be appreciated that the same microprocessor is used in executing steps 1106 and 1110, and that the voice communication device only includes one microprocessor for performing voice-related operations. In one embodiment, the microprocessor is a RISC microprocessor. At step 1112, rendered voice communication is transmitted to a peripheral device for delivery to a user.

At step 1114, outgoing voice communication for transmission over the cellular network is received. At step 1116, the outgoing voice communication is transmitted using the cellular transceiver. In one embodiment, transmitting the outgoing voice communication includes performing channel encoding on the outgoing voice communication, performing burst formatting on the outgoing voice communication, encrypting the outgoing voice communication, and modulating the outgoing voice communication.

Embodiments of the present invention provide a voice communication device for providing VoWLAN functionality with a device including a single processor. Embodiments of the present invention provide a VoWLAN communication device including a single processor and without a DSP microprocessor. Embodiments of the present invention provide a VoWLAN communication device including a MAC device implemented in hardware for performing real-time communication MAC functionality independent of the microprocessor. Embodiments of the present invention provide a VoWLAN communication device that is operable to provide passive listening and provide enhanced transmit power control for providing enhanced power consumption.

Furthermore, embodiments of the present invention provide a voice communication device for providing cellular and VoWLAN functionality, also referred to herein as CelluLAN functionality, with a device including a single processor. Embodiments of the present invention provide a CelluLAN communication device including a single processor and without a DSP microprocessor. Embodiments of the present invention provide a CelluLAN communication device including a MAC device implemented in hardware for performing real-time communication MAC functionality independent of the microprocessor. Embodiments of the present invention provide a CelluLAN communication device that is operable to provide passive listening and provide enhanced transmit power control for providing enhanced power consumption. Embodiments of the present invention provide a cellular transceiver for performing real-time voice communication functions independent of the microprocessor.

Moreover, embodiments of the present invention provide a hardware-centric MAC device for performing real-time data communication functions without requiring a microprocessor. Embodiments of the present invention provide a communication device operable to provide passive listening for reducing power consumption of the communication device.

Embodiments of the present invention provide a communication device operable to perform hardware beacon processing without requiring the use of a microprocessor for reducing power consumption of the communication device.

The foregoing descriptions of particular embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A battery-powered Wireless Local Area Network (WLAN) communication device comprising:
   an activity sensor comprising an RF section and an energy detection module, the energy detection module operable to identify on-the-air energy attributable to respective beginnings of packets available to be received at the WLAN communication device;
   a PHY module coupled with the activity sensor to be awakened responsive to the activity sensor indicating when a packet is to be at least partially decoded by the PHY and to be shutdown, the PHY module operable to decode a full MAC address from the packet header;
   a MAC address parser coupled to the PHY module to receive the full MAC address and to determine whether the packet is to be received at the WLAN communication device by comparing the full MAC address to a MAC address of the WLAN communication device, the MAC address parser operable to be awakened for performing the comparing and to be shutdown after the comparing, wherein packets to be received include beacon packets, the MAC address parser further operable to indicate that the packet being received is not for the WLAN communication device, resulting in shutdown of the PHY module, before completing reception of the packet, the PHY module being in shutdown for at least as long as an estimated remaining length of the packet being received;
   a hardware centric Medium Access Controller (MAC) formed separately from the MAC address parser and comprising a beacon processor capable of being awakened from a shutdown state to process a beacon packet, and other components operable to be awakened independently of the beacon processor to process other packets directed to the WLAN communication device, wherein
   the PHY module, the MAC address parser, the beacon processor module and the other components of the hardware centric MAC are operable to be awakened and shutdown independent of each other and of a microprocessor; and
   said beacon processor is operable to deactivate after processing a beacon packet.

2. The WLAN communication device as recited in claim 1 wherein said beacon processor is operable to reactivate prior to receipt of a packet by a time at least long enough to account for clock drift.

3. The WLAN communication device as recited in claim 1 further comprising a control plane module communicatively coupled to a hardware media access plane module, said control plane module for providing control functions of said hardware-centric MAC.

4. The WLAN communication device as recited in claim 3 wherein said hardware media access plane module is implemented in gate logic, such that real-timing requirements of said hardware-centric MAC are handled in gate logic.

5. An apparatus comprising:
   a microprocessor;
   a memory communicatively coupled to said microprocessor;
   a wireless communication module communicatively coupled to said microprocessor, said wireless communication module for receiving and transmitting packets of voice traffic over a wireless connection and comprising:
   an analog to digital converter (ADC)/digital to analog converter (DAC) interface comprising a phase-locked loop (PLL), said ADC/DAC interface for receiving a packet;
   a physical layer (PHY) device for decoding at least a header portion of a packet;
   a MAC address parser coupled to the PHY device and operable to receive a MAC address decoded from the packet and to determine whether the packet is to be further processed, while the PHY device is wireless communication module is receiving the packet;
   a hardware-centric medium access control (MAC) device communicatively coupled to said PHY device, wherein said hardware-centric MAC device is configured to perform beacon processing without requiring use of said microprocessor and to be awakened responsive to the MAC address parser, said hardware-centric MAC device comprising:
   a packet receiver configured for receiving at least one packet; and
   a beacon processing module for determining whether said packet is a beacon packet and filtering out packets that are not beacon packets, and activating responsive to detecting a beacon packet, the beacon processing portion of the MAC device being otherwise shutdown, wherein the PHY device is further operable to be deactivated while the packet is being transmitted on the wireless connection, responsive to a determination that the packet is not to be further received by the apparatus, the PHY device being shutdown using packet duration information decoded from the packet by the PHY device.

6. The apparatus as recited in claim 5 wherein the usage of packet duration information decoded from the packet is conditioned on passing a cyclic redundancy check for the packet duration information.

7. The apparatus as recited in claim 5 wherein said beacon processing module, said ADC/DAC interface and said PHY device are operable to reactivate prior to receipt of a subsequent packet by a time at least long enough to account for clock drift.

8. The apparatus as recited in claim 5 wherein said hardware-centric MAC device further comprises a control plane for providing control functions of said hardware-centric MAC device.

9. The apparatus as recited in claim 8 further comprising a hardware media access plane module is implemented in gate logic, such that real-timing requirements of said hardware-centric MAC device are handled in gate logic.

10. A method to be performed in a Wireless Local Area Network (WLAN) communication device, the method comprising:

sensing on-the-air energy attributable to a beginning of a packet available to be received at the WLAN communication device;

activating a PHY module coupled with the activity sensor, responsive to the sensing of the packet;

awakening a MAC address parser coupled to receive packet header information from the PHY module during a period of time while the PHY module is decoding the packet;

determining, at the MAC address parser, whether the packet being received is for the wireless communication device;

shutting down the PHY module and the MAC address parser responsive to determining that the packet being received is not for the wireless communication device, wherein the shutting down is performed while the packet is being transmitted and comprises maintaining the PHY module and the MAC address parser in shutdown for a length of time that the packet is being transmitted, the length of time being determined according to information extracted from packet header information by the PHY module;

awakening a beacon processing module for detecting whether the packet being received is a beacon packet, and responsive to detecting a beacon packet, awakening a packet process unit to process the beacon packet without use of any microprocessor;

maintaining a general purpose microprocessor in a sleep state while processing the beacon packet; and awakening the general purpose microprocessor to process voice data contained in a packet addressed to the MAC address of the WLAN communication device.

11. The method as recited in claim 10 wherein said activating comprises activating said hardware beacon processing module by a time at least long enough to account for clock drift.

* * * * *